(12) United States Patent
Beckman

(10) Patent No.: US 11,319,126 B2
(45) Date of Patent: May 3, 2022

(54) MATERIALS WITH TESTABLE, HEALABLE FIBERS

(71) Applicant: Christopher V. Beckman, Los Angeles, CA (US)

(72) Inventor: Christopher V. Beckman, Los Angeles, CA (US)

( * ) Notice: Subject to any disclaimer, the term of this patent is extended or adjusted under 35 U.S.C. 154(b) by 147 days.

(21) Appl. No.: 16/681,810

(22) Filed: Nov. 12, 2019

(65) Prior Publication Data

US 2020/0156838 A1 May 21, 2020

Related U.S. Application Data

(63) Continuation-in-part of application No. 15/157,393, filed on Aug. 2, 2016, now Pat. No. 10,472,147, which is a continuation-in-part of application No. 14/217,414, filed on Mar. 17, 2014, now Pat. No. 9,340,340.

(60) Provisional application No. 61/852,120, filed on Mar. 15, 2013.

(51) Int. Cl.
*B65D 63/10* (2006.01)
*G01N 27/20* (2006.01)

(52) U.S. Cl.
CPC ..... *B65D 63/1018* (2013.01); *B65D 63/1009* (2013.01); *B65D 2563/105* (2013.01); *G01N 27/20* (2013.01)

(58) Field of Classification Search
CPC .............. B65D 63/109; B65D 63/1018; B65D 2563/105; B65D 63/1009; Y10T 24/1498; Y10T 24/37; Y10T 24/3726; G01N 27/20
See application file for complete search history.

(56) References Cited

U.S. PATENT DOCUMENTS

| | | | | |
|---|---|---|---|---|
| 7,170,007 B2* | 1/2007 | Varkey | ............... | H01B 7/046 174/102 R |
| 7,188,406 B2* | 3/2007 | Varkey | ............... | H01B 13/26 174/104 |
| 7,219,739 B2* | 5/2007 | Robichaux | ............ | E21B 19/002 166/352 |
| 7,326,854 B2* | 2/2008 | Varkey | ............... | H01B 7/046 174/102 R |
| 7,402,753 B2* | 7/2008 | Varkey | ............... | H01B 7/046 174/102 R |
| 8,845,943 B2* | 9/2014 | Hertlein | ............. | A44B 18/0065 264/167 |

(Continued)

*Primary Examiner* — Robert Sandy
*Assistant Examiner* — Louis A Mercado

(57) ABSTRACT

Specialized flexible connectors are provided with testable integrity. In some embodiments, each of a plurality of tension load bearing fibers within such a flexible connector are individually testable by specialized computer hardware and software. In some embodiments, healing of such specialized flexible connectors is carried out (e.g., autonomously, by hardware connected with or integral with the flexible connector). In some embodiments, healing fluid passages or voids are included within such flexible connectors, which accept and drain healing fluid. In some embodiments, such healing fluids may include healing particles and a carrier fluid. In some such embodiments, such healing particles are charged. And, in some embodiments, materials comprised in such fibers, or which define at least part of such passages or voids, are provided with a charge opposite from a charge of such particles.

18 Claims, 14 Drawing Sheets

(56) References Cited

U.S. PATENT DOCUMENTS

| | | | | |
|---|---|---|---|---|
| 9,093,191 B2* | 7/2015 | Hiel | .......................... | H02G 7/04 |
| 9,093,194 B2* | 7/2015 | McCullough | ............ | H01B 7/14 |
| 2008/0282664 A1* | 11/2008 | Chou | ....................... | D07B 5/12 |
| | | | | 57/210 |
| 2011/0024409 A1* | 2/2011 | Shah | ....................... | C04B 35/80 |
| | | | | 219/482 |
| 2014/0276359 A1* | 9/2014 | Alvarez | ................. | A61K 33/00 |
| | | | | 604/21 |
| 2015/0017416 A1* | 1/2015 | Ruby | .................... | B29C 70/523 |
| | | | | 428/298.7 |
| 2015/0017437 A1* | 1/2015 | Kenny | ................. | B29C 70/523 |
| | | | | 428/367 |

* cited by examiner

MATERIALS WITH TESTABLE, HEALABLE FIBERS

CROSS-REFERENCE TO RELATED APPLICATION

This application is a continuation-in-part of co-pending U.S. application Ser. No. 15/157,393, titled "More Versatile Self-Bonding Cords," filed on May 17, 2016, now U.S. Pat. No. 10,472,147, which, in turn, is a continuation-in-part of U.S. application Ser. No. 14/217,414, titled "Selectable-Length Zip Tie and Tape," filed on Mar. 17, 2014, now U.S. Pat. No. 9,340,340, which, in turn, claims the benefit of U.S. Provisional Application No. 61/852,120, titled "Mechanical Arts Provisional I," filed Mar. 15, 2013, the entire contents of each of which are hereby incorporated by reference into the present application.

COPYRIGHT NOTICE

© Copyright 2013-2021 Christopher V. Beckman. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to tapes, cords, ropes, zip ties and other flexible fasteners.

BACKGROUND OF THE INVENTION

Zip ties and other flexible synthetic cords and adhesive tapes have been used to fasten together loose items for many decades. Most fastening cords hold items together with knots and friction. Zip ties implement a one-way looped ratchet at one end of a length of cord, through which the other end may be inserted and, due to sloped teeth along the length of the cord interfacing with the ratchet, tightened and locked in place. In general, adhesive tapes are flatter along their length than synthetic cords, and often include an adhesive on at least one side. As a result, tape is well-suited for jobs binding flat, smooth items.

It should be understood that the disclosures in this application related to the background of the invention in, but not limited to, this section titled "Background," are to aid readers in comprehending the invention, and do not set forth prior art or other publicly known aspects affecting the application; instead the disclosures in this application related to the background of the invention may comprise details of the inventor's own discoveries, work and work results, including aspects of the present invention. Nothing in the disclosures related to the background of the invention is or should be construed as an admission related to prior art or the work of others prior to the conception or reduction to practice of the present invention.

SUMMARY OF THE INVENTION

New devices and techniques for fastening loose items together are provided. In some aspects of the invention, a new uniform, self-ratcheting cord is provided, with unlimited possible divisions (for example, by cutting the cord at any point along its length), and with unlimited potential insertion points for self-threading and ratcheting along its length. In some embodiments, the points of insertion comprise compressible ports through which a loose end of the cord, and a length of cord following it, can be self-threaded. Complementarily-shaped ridges, pawls and/or other ratcheting aspects, approximately perpendicular to the length of the cord, may line the exterior of the cord, and may be an appropriate size, shape and compressibility to permit the cord to move through the ports when so inserted and threaded, but to lock against and prevent backing out. Preferably, the ports are compressible to a limited degree by the act of self-threading, changing conformation preferably chiefly due to pivoting flexibility along the length of the cord material. This design allows the circumference of a port to be squeezed and pass through another port, when inserted through that other port, while maintaining tight holding or ratcheting. Preferred cord embodiments are composed of a sturdy material with bendability, limited flexibility and, especially, limited compressibility and limited stretchability. Hard plastics with a high tensile strength and some bendability, such as nylon, are preferred.

In some embodiments, ridges or a ratchet device are also comprised in the ports, in a parallel configuration to the length of the cord at such ports, but perpendicular to a length of cord threaded through the ports. In some embodiments, the ports themselves may have an exterior shape to assist in locking the cord when threaded. Some embodiments also comprise periodic scoring and/or other built-in devices to permit snapping the cord by hand at any desired length by sufficient bending, twisting, lever-pulling, or other forms of actuation. In still other embodiments, the cord may be released by a button, lever, or by changing the direction or pressure of the cord relative to the port through which it is threaded, at the point where it is threaded through a port. Differential ridge angles and locations within the ports cause then cause these embodiments of cord to release, such that they may be backed out.

In additional aspects, new forms of self-bonding cord with a self-gripping (e.g., spiraling) memory and force-loading, are provided. These self-bonding cords comprise unlimited possible divisions and self-bonding points. In some embodiments, radially-emanating columns with barbs for self-bonding are provided, where the barbs are angled to promote holding as they are spread by the interposition of other columns during self-bonding of the cord. The columns also define the outer surface of the cord, having outer gripping features that create an outer surface of the cord. In other embodiments, a cord has a memory and conformational structure providing elastic bundling, and encouraging self-bonding and wrapping—with semi-circular semi-ports and outer holding ridges spaced at intervals corresponding with the contact profile of the cord. In a method of use, one wraps various items in at least one loop of the cord, and presses loose ends of the cord together, creating a strong, reversible self-bond. Multiple-strength touch bonding is also provided.

In other embodiments, specialized flexible connectors are provided which with testable integrity. In some such embodiments, each of a plurality of tension load bearing fibers within such a flexible connector are individually testable by specialized computer hardware and software. In some embodiments, healing of such specialized flexible connectors is carried out (e.g., autonomously, by hardware connected with or integral with the flexible connector). In some embodiments, healing fluid passages or voids are included within such flexible connectors, which accept and drain healing fluid. In some embodiments, such healing fluids may include healing particles and a carrier fluid. In some such embodiments, such healing particles are charged. And, in some embodiments, materials comprised in such fibers, or which define at least part of such passages or voids, are provided with a charge opposite from a charge of such particles.

Canons of Construction and Definitions

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

Unless otherwise stated, all trademarks disclosed in this patent document and other distinctive names, emblems, and designs associated with product or service descriptions, are subject to trademark rights. Specific notices related to copyright also accompany the drawings incorporated in this application; the material subject to this notice, however, is not limited to those drawings.

BRIEF DESCRIPTION OF THE DRAWINGS

FIG. 10B is a perspective view of a self-bonding cord similar to that depicted in FIG. 10, above, but under less tension, and exhibiting an exemplary spiral structure tending to encourage self-bonding of the cord.

DETAILED DESCRIPTION OF THE INVENTION

Figure 1:
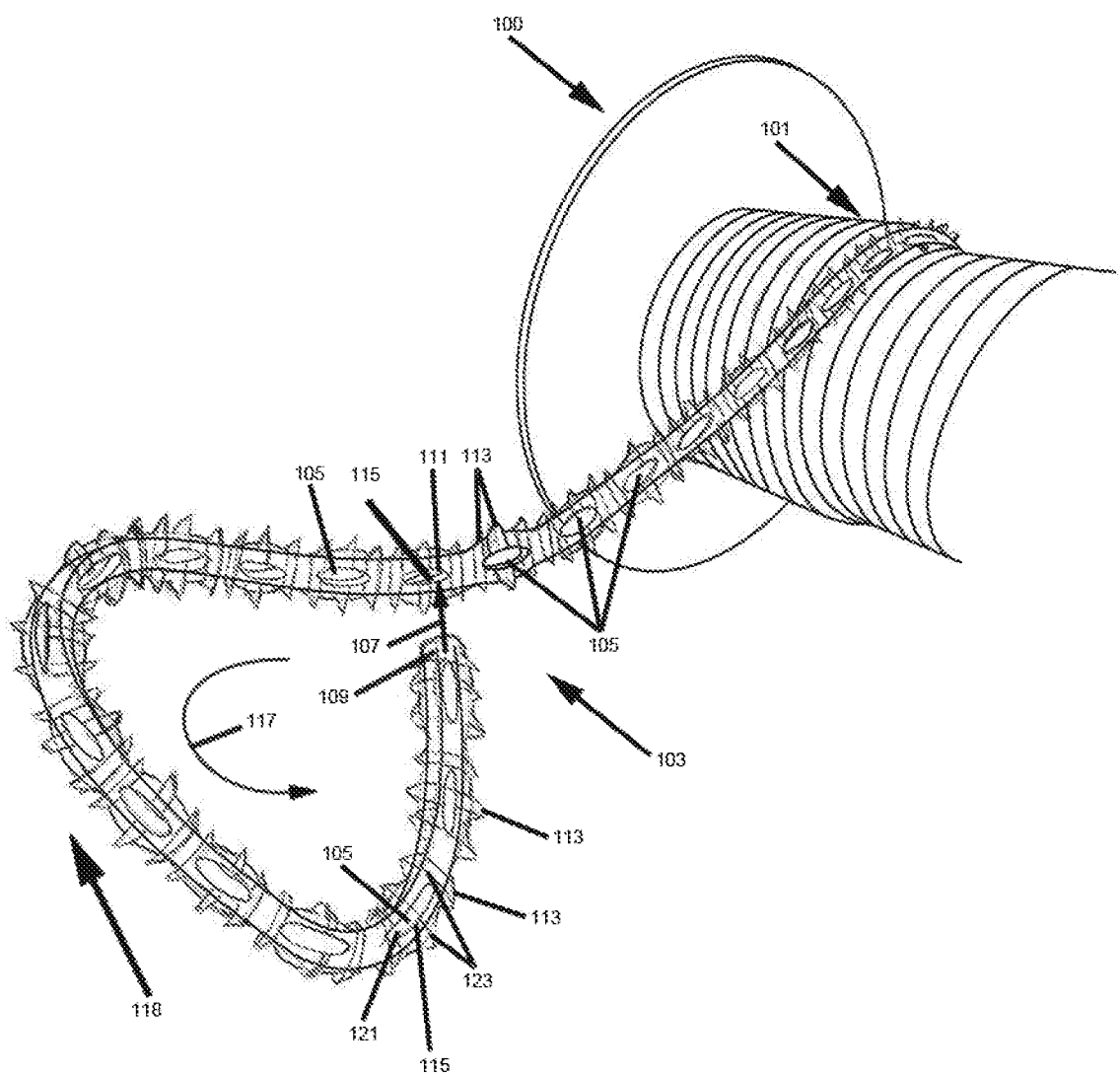
FIG. 1 is a perspective view of a spool of self-ratcheting cord, in accordance with aspects of the present invention, including a paid-out length of said cord.

FIG. 1 is a perspective view of a spool 100 of self-ratcheting cord 101, in accordance with aspects of the present invention, including a paid-out length 103 of said cord. Cord 101 comprises numerous uniformly distributed ports, such as those examples pictured as 105, along its length, which serve as potential insertion points for threading cord 101 through itself ("self threading), as demonstrated by directional path arrow 107, which shows a threading motion path of the loose end 109 of cord 101, through port 111 (one of ports 105). As will be explained in greater detail below, as cord 101 is threaded through any of ports 105, one-way locking ridges 113, lining the circumference of the roughly cylindrical cord 101, interface with and lock against ridges or a ratchet 115, which line the inside of each port 105. Preferably, one-way locking ridges 113 are sloped on at least some of their sides or profile facing a port during and just prior to insertion for self-threading, permitting the compression of ridges 113 during insertion. However, on the opposite sides of ridges 113, facing in a direction away from a port during and just prior to insertion through it, ridges 113 are either flat or barbed in that direction, preventing cord 101 from backing out of a port 105 once self-threaded through it. In some embodiments, ridges or ratchet 115 comprise complementarily-shaped flat or barbed edges, facing the flat or barbed sides of ridges 113 once ridges 113 have been threaded past ridges or ratchet 115 due to self-threading.

In some such embodiments, ridges or ratchet 115 also comprise sloped surfaces, on at least some of their sides or profile facing the end of the cord 101 just prior to and during self-threading. Because such embodiments require threading in one direction only for proper function, these embodiments may further comprise a camber, natural bend or "memory", causing a tendency of cord 101 to curl in a direction generally toward a proper orientation for self-threading when slack, as shown by curling direction arrow 117, which generally demonstrates the direction of neighboring curl 118 in cord 101. In this way, errors in insertion direction are reduced or eliminated for users of cord 101. In some embodiments, however, in which at least either ridges or ratchets 115 do not comprise the sloped sides or profiles set forth above, cord 101 may be threaded through ports 111 in any direction, and such a camber, natural bend or memory need not be provided in cord 101.

As shown in the figure, ports 111 of cord 101 expand and/or bulge outward from the length of cord, at least during self-threading, in order to accommodate the insertion of an end 109 through a port 111. Preferably, ports 111 maintain at least part of that expansion or bulge prior to insertion, to aid in locating ports 111, and in guiding an end 109 through ports 111. To ease the passage of cord 101 through a port 111 during self-threading, however, ports 111 are compressible, preferably due to the use of a flexible cord material which turns easily along its length. However, to provide a tight fit, and effective ratcheting, the cord material preferably has limited compressibility, or is even not substantially compressible. Furthermore, preferably, when any of ports 111 are compressed during self-threading through another port 111, a central hole or void 121 is substantially eliminated because the combined, compressed material 123 comprising ports 111 comprises a combined, circumference or other perimeter complementary in size and/or shape to, and substantially filling or abutting, a central hole or void 121 of the port 111 through which the cord is being self-threaded.

Figure 2:
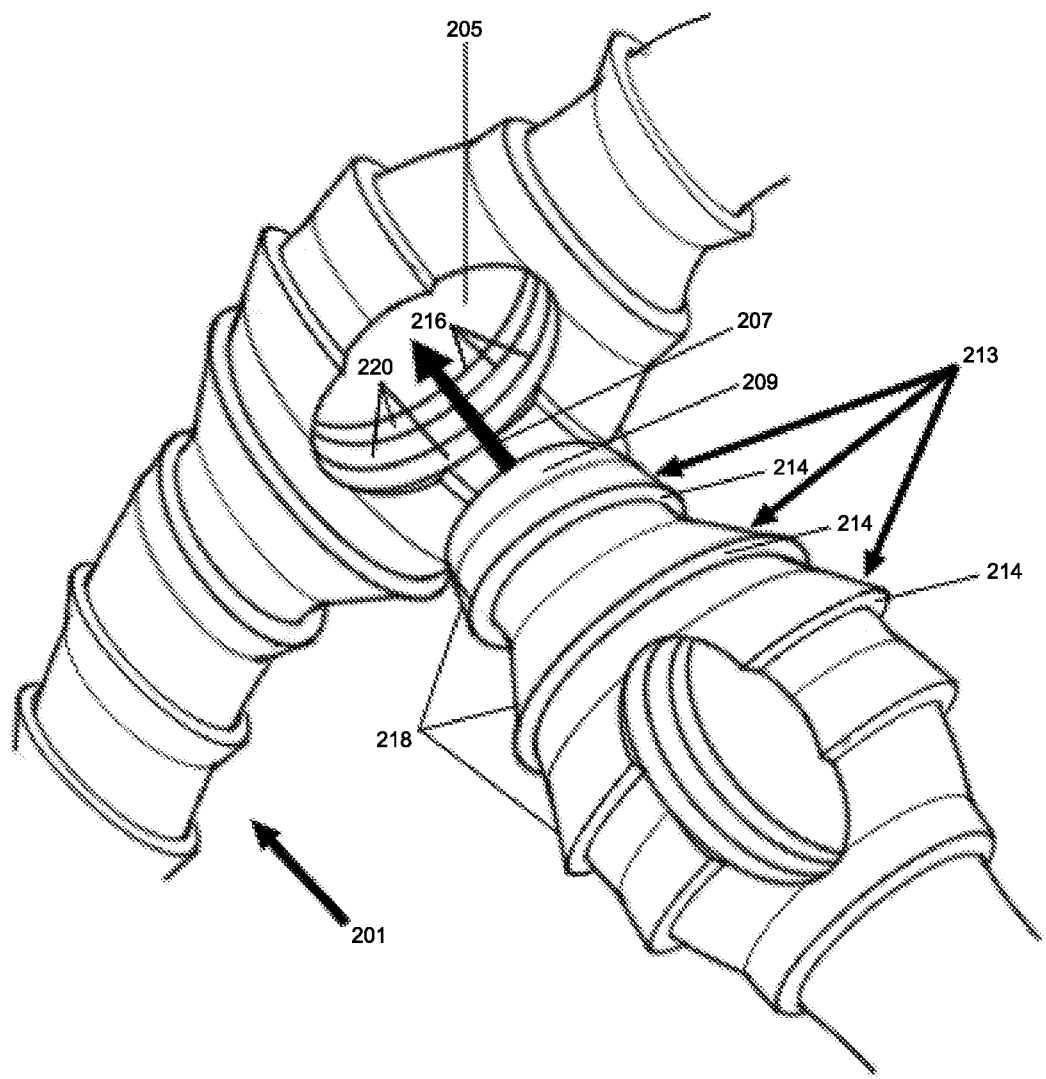
FIG. 2 is a perspective view of parts of the same form of self-ratcheting cord discussed with reference to FIG. 1, above, but larger, to illustrate details of a self-threading and self-ratcheting mechanism of the present invention.

FIG. 2 is a perspective view of parts of the same form of self-ratcheting cord, now 201, discussed with reference to FIG. 1, above, but larger, to illustrate details of a self-threading and self-ratcheting mechanism of the present invention. An end 209 of cord 201 is shown facing an open port 205, similar in nature to ports 105 of FIG. 1. Directional path arrow 207 shows the potential movement of cord end 209 through port 205 when self-threaded through that port. As can be seen more clearly in the present figure, exemplary outer ridges 213 of cord 201 comprise a flat or barbed trailing edge 214, for interlocking with flat edges 216, lining the inside surface of port 205. Flat edges 216 face in the same direction as the direction of threading shown by arrow 207, which direction faces interlocked edges 214 once threaded through port 205. As also shown in greater detail, sloped leading edges 218, facing the direction of port 205 prior to threading end 209 through it, are also comprised in ridges 213, and permit the threading of end 209 through port 205. Similarly, sloped edges 220 also permit and ease threading end 209 through port 205.

Figure 3:
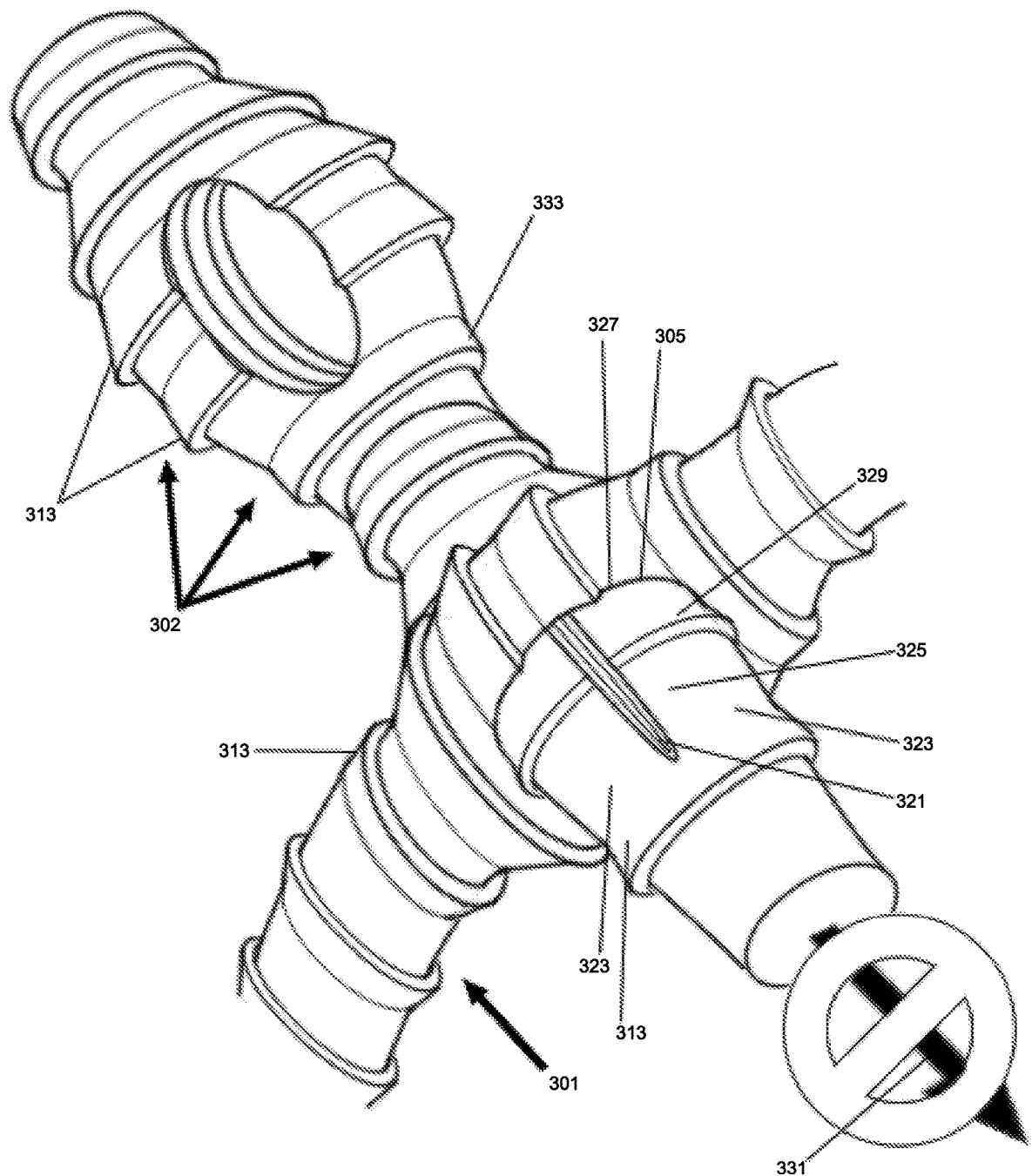
FIG. 3 is a perspective view of the same form of self-ratcheting cord discussed with reference to FIG. 2, above, with part of the cord pulled through one of many self-threading, self-ratcheting ports along the length of the cord.

FIG. 3 is a perspective view of the same form of self-ratcheting cord, now 301, discussed with reference to FIG. 2, above, with part of cord 301, namely, cord section 302, pulled through one of many self-threading, self-ratcheting ports, now shown as 305, along the length of the cord. As discussed above, as one of ports 305, namely 325, is threaded through another port 305, namely 327, port 325 becomes compressed, and its central hole or void 321 is reduced to a slit. The comprised material 323 of port 325 is pressed together, and substantially occupies, with its outer surface ridges, such as the example shown as 329, the entire port 327 through which the material 323 is threaded. In this way, the outer surface ridges of port 325 fully interface with the complementary interior ridges of port 327 as the cord 301 is self-threaded, and cord section 302 is prevented from backing out of port 327 in the direction shown by hypothetical attempted motion arrow 331. Furthermore, as also can be seen in FIG. 3, a subsection 333 of section 302 does not comprise a port 305, yet occupies a substantially identical circumference or space, also complementary to the inner voids of all ports 305, as compressed material 323 of port 325.

As a result, cord 301 may be threaded through any of ports 305, to a wide variety of required degrees of self-threading and ratcheting between the inner ridges or ratchets of ports through which self-threading and ratcheting occurs and the outer ridges of cord 301, such as the examples shown as 313. Threading, ratcheting and locking against backing out is not limited to particular lengths or parts of cord 301, such as parts with or without ports 305. However, as improved in the embodiment discussed immediately below, additional force and features associated with ports 305 may enhance the holding force of cord 301 when self-threaded and fastening together items.

Figure 4:
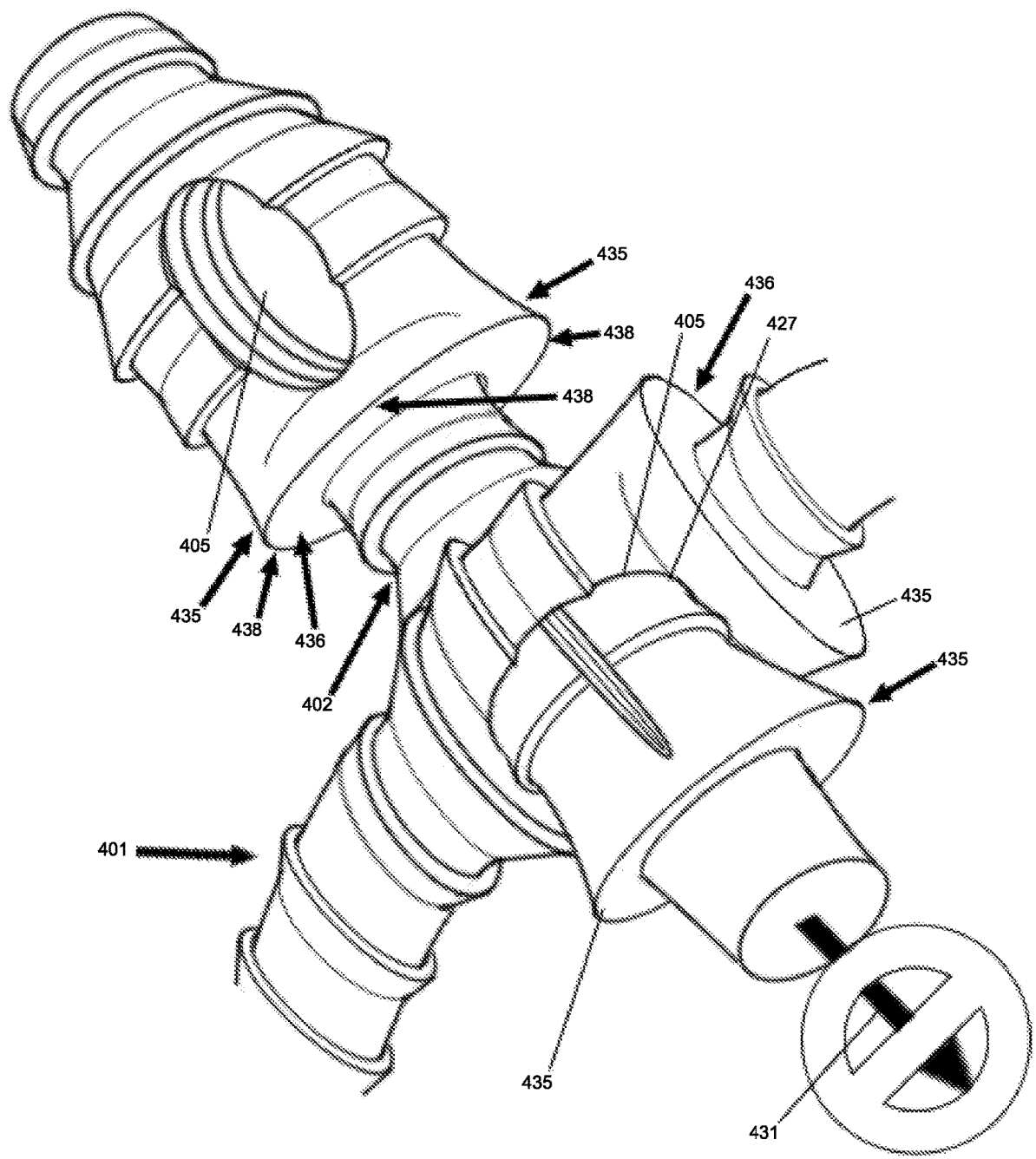
FIG. 4 is a perspective view of an alternative embodiment of a self-ratcheting cord, in accordance with aspects of the present invention, in which exterior features of self-threading ports further comprise additional, larger locking barbs.

FIG. 4 is a perspective view of parts of an alternative embodiment of a self-ratcheting cord, 401, in accordance with aspects of the present invention, in which exterior features of self-threading ports further comprise additional larger locking barbs, such as those examples shown as 435. As shown in the figure, larger locking barbs 435 further enhance the holding power of the self-threading, ratcheting cord 401 by opposing and holding the outer surface of a port 405 through which it has been self-threaded. Preferably, larger locking barb 435 is present on the trailing end of each of ports 405, and, as with several of the locking ridges discussed in embodiments above, comprises a flat surface, in this instance, the examples shown as 436, which face a port through which they have been threaded, and prevent backing out of cord 401 through such a port. For example, larger locking barb 438, which is shown having been threaded through port 427, opposes the attempted movement of cord 401 in the direction shown by arrow 431, preventing cord section 402 from backing out in that direction, by holding the outer surface of port 427 (if pulled against it, in the direction shown by arrow 431) that locking barb 438 faces.

Figure 5:
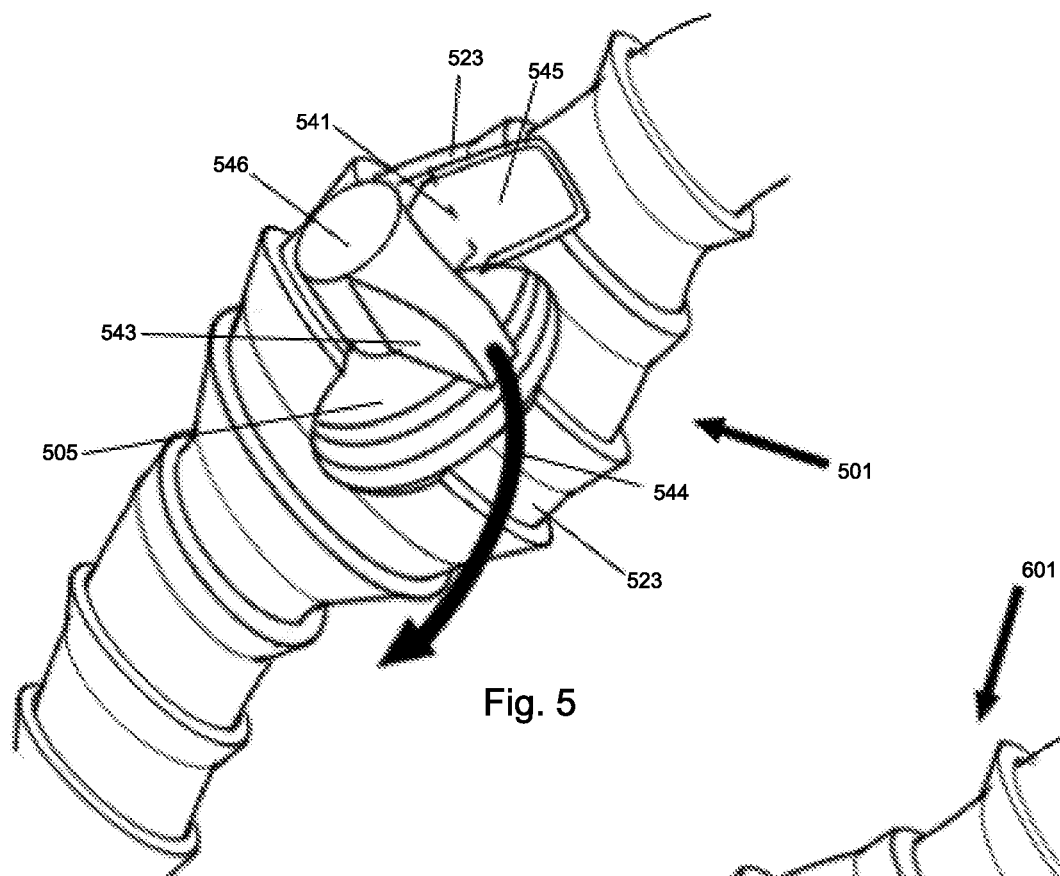
FIG. 5 is a perspective view of another alternative embodiment of a self-ratcheting cord, in accordance with aspects of the present invention, comprising scoring for snapping open lengths of the cord without tools.

FIG. 5 is a perspective view of another alternative embodiment of a self-ratcheting cord 501, in accordance with aspects of the present invention, comprising scoring 541 for snapping open lengths of the cord by hand, without the need for tools. To assist in such selective snapping, a lever 543 rooted in one of two sections of load-bearing connecting material 523, is embedded in a body pocket 545. Due to the body pocket 545, lever 543 does not substantially extend outward beyond the remaining outline or profile of surrounding material of cord 501, unless and until lever 543 is actuated. When a user pulls lever 543 outward, as shown by lever action arrow 544, connecting material 523 is pulled taught across a tensioning stanchion 546. As a result, if lever 543 is sufficiently pulled along the path shown by arrow 544, the connecting material 523 will break completely into two separate pieces, and will no longer hold port 505 closed. If a section of cord 501 is currently held within port 505 when such a lever action breaking connecting material 523 is carried out, that section 502 will then be released, and items held together by cord 501 may no longer be held together.

Due to the size and edges of scoring 541, and the leverage applied by lever 543, the amount of force required to sufficiently pull lever 543 to cause connecting material 523 to break is low enough to be applied by hand by an average person, and far lower than the amount of lengthwise holding force of cord 501 (the holding force resulting from the tensile strength of cord 501).

Figure 6:
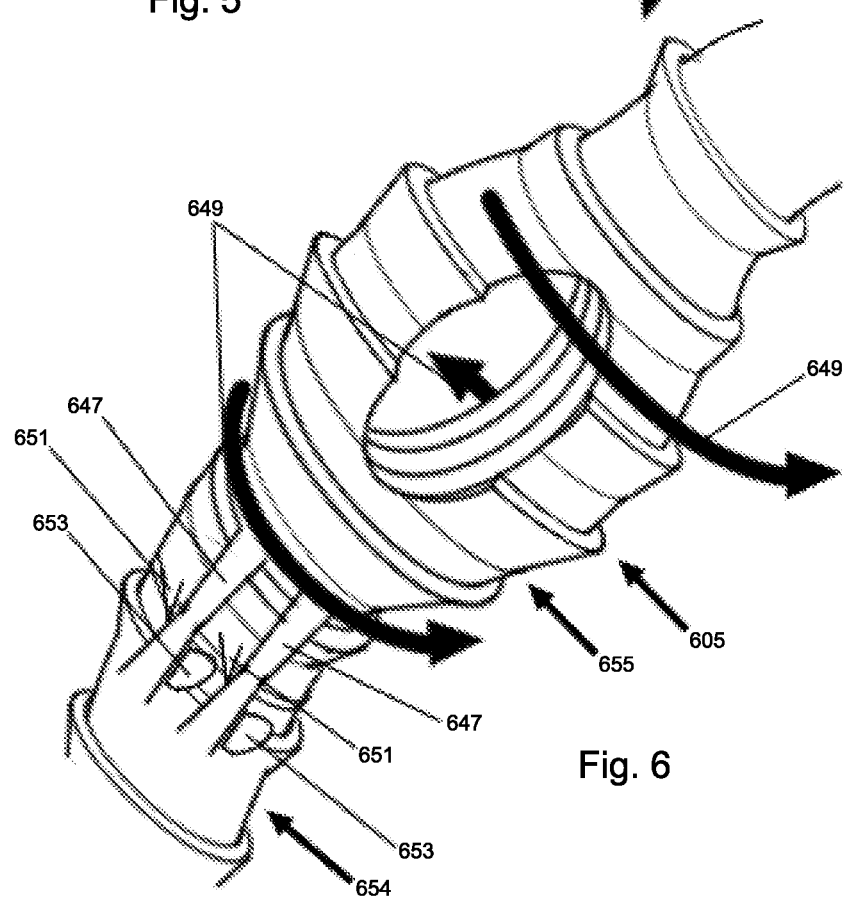
FIG. 6 is a perspective view of another alternative embodiment of a self-ratcheting cord, in accordance with aspects of the present invention, configured for freely selecting and breaking off lengths of the cord by twisting the cord, with no need to use auxiliary tools.

FIG. 6 is a perspective view of another alternative embodiment of a self-ratcheting cord 601, in accordance with aspects of the present invention, configured for freely selecting and breaking off lengths of the cord by twisting the cord, with no need to use auxiliary tools. As mentioned previously, uniformly distributed ports, now 605, preferably bulge slightly when not currently threaded through another port. As one of several added benefits to this design, ports 605 may be used for leverage and grip in twisting part of cord 601 (for example, in the rotational direction indicated by motion arrows 649), which can be used to carry out further aspects of the invention. In one embodiment, load-bearing straps, such as the examples shown as 647, may be completely broken into separate pieces by such twisting. As port 605 is twisted clockwise (in the perspective of the figure), slicing edges 651 are pushed through straps 647, and into cutting blocks 653. As a result, each of straps 647, which otherwise comprise a complete link between two separate parts, 654 and 655, of cord 601, are completely severed, and cord 601 is broken in two at a break point to the left of the port 605 used as a twisting handle.

Figure 7:
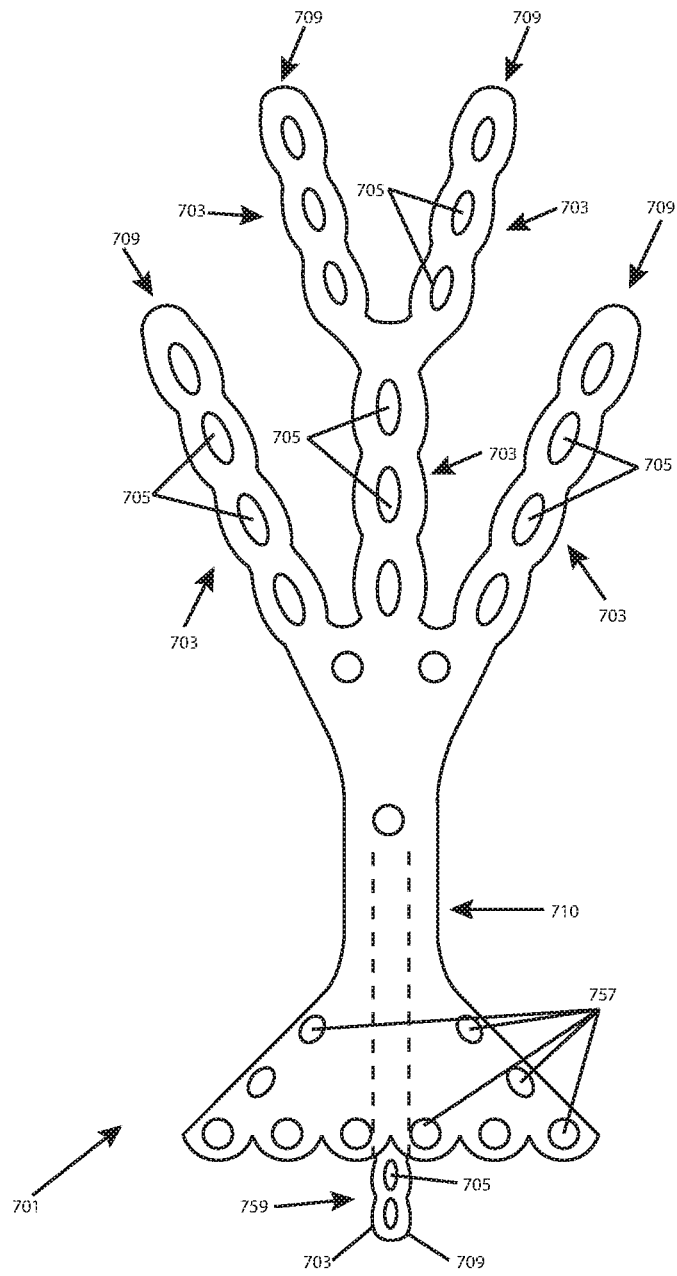
FIG. 7 is a front view of an exemplary ramifying harness comprising self-threading cord, with multiple potential points of insertion, self-threading and ratcheting, in accordance with aspects of the present invention.

FIG. 7 is a front view of an exemplary ramifying harness 701 comprising self-threading cord sections 703, with multiple potential points of insertion, self-threading and ratcheting, in accordance with aspects of the present invention. As in several of the embodiments set forth above, the cord sections comprise uniformly distributed ports, such as the examples now shown as 705, along their length, and further comprise ratchets, barbs or ridges to cause self ratcheting and locking in accordance with aspects of the invention discussed throughout this application. Also as with several of those previously-discussed embodiments, loose ends, now shown as 709, of those cord sections may be threaded through any and several such ports 705, as a user's election, to cause such self-ratcheting and locking. In addition, harness 701 comprises a main body section 710, which may comprise additional, albeit fewer, ports, such as the examples shown as 757, the voids or holes of which are identical in shape and features as the voids or holes of any of the other ports set forth above in this application. By threading the ends 709 of sections 703 through various ports 705 and/or 757, a wide variety of holding configurations for several items, or complex items requiring more than one holding point. In fact, each of ends 709 may be threaded through more than one port 705 and/or 757, creating several more holding loops than would otherwise be possible, at the election of the user. As another potential aspect, a central cord 759 may extend away from the remaining plane of the harness, and therefore may be useful for fastening multiple harnesses together. Of course the number of ends 709, loops and body components, and shapes depicted in FIG. 7 are exemplary only, and a wide variety of complex cord arrangements with multiple ends, sections and body shapes are possible and fall within the scope of the present invention.

Figure 8:
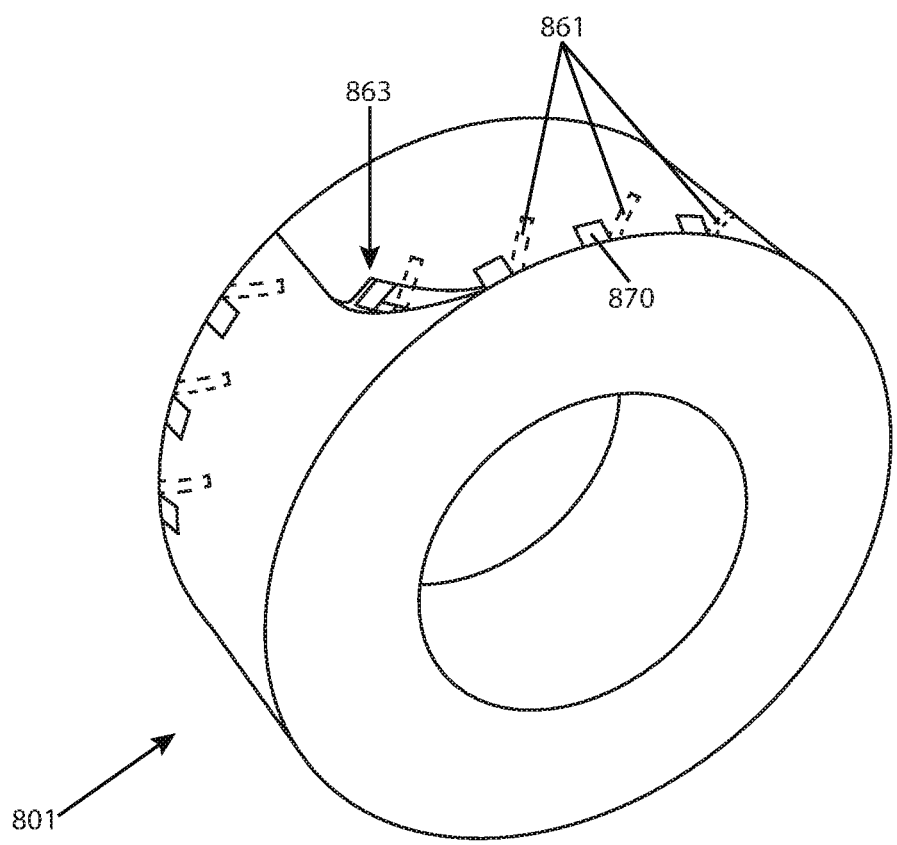
FIG. 8 is a perspective view of a roll of tape or cord 801, in which camber material 861 lifts and exposes a loose end of the tape or cord.

FIG. 8 is a perspective view of a roll of tape or cord 801, in which camber material, such as that shown as elevating strips 861, lifts and exposes a loose end 803 of the tape or cord. Regardless of where tape or cord 801 is cut, producing a loose end such as 803, at least a corner 863 of the tape or cord at the loose end 803 will be raised, rather than laying flat against roll 801. In this way, corner 863 and end 803 may be more easily located, and a user may extract tape or cord from the roll 801. While the roll of tape or cord 801 may include an adhesive, for example, on the side facing roll 801, preferably, the surface of a section 863 of tape or cord abutting each strip 861, in sections 870, contains less adhesive, a weaker adhesive, or has been bound to the roll 801 less completely or effectively (for example, with less force), such that the upward pressure from the camber of elevating strips 861 is able to overcome it. As a result, corner 863 is lifted away from the remainder of roll 801. To enhance the visual impact of corner 863, lighting or coloring may be trained on or caused by corner 863's position, lifted away from roll 801. For example, without contact with roll 801, and its collective color, a translucent tape (and especially, a fluorescent translucent tape) may reveal corner 863 with greater contrast. If camber is used on only one side of roll 801, preferably, the side may be switched periodically along the length of cord or tape, to maintain a flat profile for roll 801.

Figures 9, 9A:
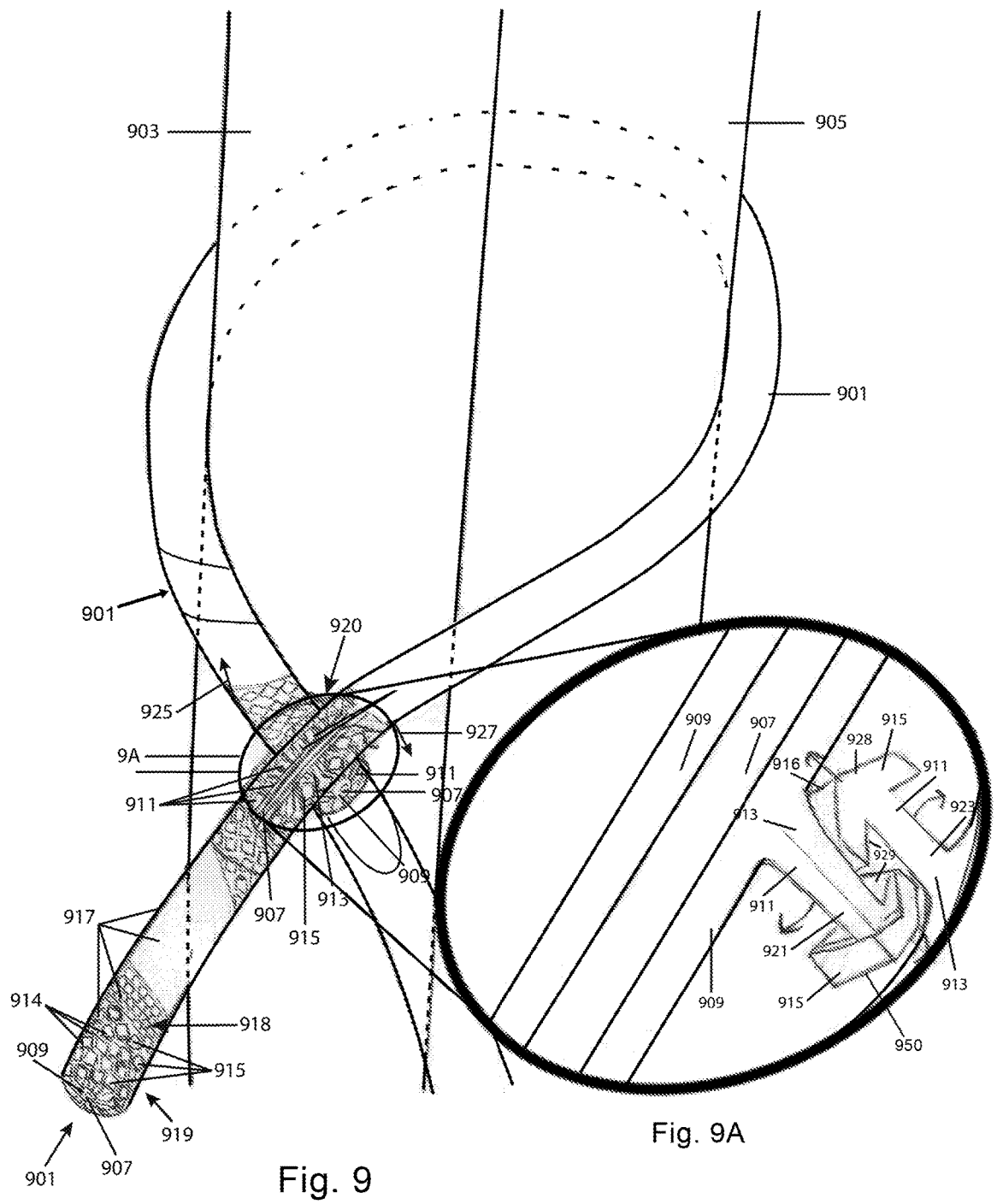
FIG. 9 is a partial cutaway perspective view of an exemplary self-bonding cord, in accordance with aspects of the present invention, shown bundling two rods together.
FIG. 9A is an enlarged view of part of FIG. 9, depicting more self-bonding features of the same exemplary cord.

FIG. 9 is a partial cutaway perspective view of an exemplary reversibly self-bonding cord 901, in accordance with aspects of the present invention, shown bundling two rods, 903 and 905, together. As with other cords and tapes set forth in this application, cord 901 preferably is comprised of a strong material, with a tensile strength, and yet is flexible, allowing for turns, wrapping and binding together of a wide variety of objects. In some embodiments, cord 901 is comprised of a material with limited or negligible stretchability and compressibility during operation as a fastener, as in some other embodiments set forth in this application. However, in other embodiments, cord 901 (and any other cord set forth in this application) comprises a stretchable material or matrix, or an elastomeric material or matrix, or a combination thereof—permitting additional flexibility, gripping and the application of force-loading (active pressure or binding force that continues over a range of bound diameters—continuing to bind with the same force when bound objects shift and become less wide along their collective diameter, or if the cord slips to some degree as it is binding objects together). In some embodiments, materials with cushioning components and conformable materials with "memory" may also be comprised in the cords. In some embodiments, a combination of any materials set forth in this application may be used in a single cord or cord set, to capitalize on advantages created by each material.

For example, cord 901 may comprise a material with limited stretchability and high tensile strength in a bendable but strong core 907, while also comprising a more flexible, stretchable compressible and bendable softer layer 909, surrounding it. In some embodiments, strong core 907 may have a memory (a tendency to take on a physical conformation, shape or arrangement with particular bends, coils, or other structural patterns) conducive to binding and bonding. In some more specific instances of such embodiments, that memory may be either relatively fixed (e.g., a camber created along the length of cord 901 during manufacturing) or user-adjustable (e.g., with a tool-adjustable truss rod, or by hand application, as in the case of conventional twist-ties).

As pictured, softer layer 909 also preferably comprises aspects that promote self-bonding caused by pressing two sections of cord 901 together. Radiating outward at approximately 90 degree angles from the surface of softer layer 909 (and from the central line of cord 901, which is also centered on strong core 907) are a plurality of flexible interlockable columns, such as the examples pictured as 911. Interlockable columns 911 preferably comprise, in turn, a more stretchable, flexible base, such as those pictured as examples 913, at the point of connection with the remainder of softer layer 909, and a streamlined inward-catching barb, such as the examples pictured as 915. Interlockable columns 911 preferably create a gap-free, grippable outer surface 917, preferably with a substantially tessellating outer profile shape at the outer surface of each barb 915, covering the outer circumference of cord 901. For example, as pictured, a square or rhomboid outer profile for a plurality of surface-forming barbs 915 (examples of which are shown as 914) is pictured near one end 919 of cord 901. In some embodiments, an incompletely tessellating shape, as pictured in area 918, may be used for barbs 915, or some gaps may be provided to aid the interlocking operations upon contact that create self-bonding between sections of cord 901. In others, however, the tessellation is more seamless, with neighboring barbs 915 in contact with one another, to provide a more continuous outer surface, more similar to a conventional rope or cord. In any event, an outer surface, grippable by a user in much the same way as a traditional outer surface of a rope or other cord, is provided. To aid in that gripping, the outward-facing surface, such as the example shown as 950, of each of said barbs 915 may comprise elastomeric ridges, such as the example shown as 916, or other grip-encouraging textures while, at the same time, having a slope profile encouraging pointed objects such as barbs, e.g., from another length of said cord) to slide between and penetrate the outer surface of the cord. It should be understood that, although only part of the surface of cord 901 is shown as formed from the outer surfaces of barbs 915, and a few different forms of barb outer surfaces are pictured, for ease of illustration, in some embodiments, substantially all of the outer surface of cord 901 is formed by the outer profile of columns such as 911, which fill and form that surface for the entire cord. Also, in some embodiments, the outer surface of cord 901 is created by a single form of barb 915, rather than a mixture of different forms, which were pictured for illustrative purposes. Preferably, the columns emanate from the interior layers (or a single layer/piece) of cord 901 with a radial symmetry about a central line of cord 901.

Enlarged view 9A illustrates an exemplary form for interlockable columns 911, as well as an instance of interlocking between two such columns, 921 and 923 at a contact area between two bonded lengths of cord 901—namely, intersection 920. While two such columns are pictured in the cut-away view, for simplicity of view and comprehension, it should be understood that a plurality of such columns in fact line cord 901 at the location of intersection, just as shown at end 919. The plurality of columns is important for a number of reasons, not the least of which is the lateral and subjacent support that each column provides for one another during coupling to form a self-bond. This support creates a collective pressure that aids in retaining the bond created by an interlocking operation. An interlocking operation can be carried out by pressing any two sections of cord 901 together, as shown by upward movement/pressure arrow 925 and downward movement pressure arrow 927 at intersection 920. Because both the outer surface 928 of each barb 915 is sloped to deflect the passage of inward-pressed objects, and because the interlockable columns 911 comprise a flexible material, the barbs 915 of columns 921 and 923 tend to pass next to one another, as pictured, when the sections of cord are pressed together at intersection 920, regardless of their initial positioning (prior to the application of bonding pressure). And because the inner surfaces 929 of barbs 915 are angled with a downward slope of about the same angle, those inner surfaces tend to join with another and hold the sections together, once barbs 915 pass one another, as pictured. Each of the barbs, such as the examples pictured, then serve to bond and hold the lengths of cord 901 together. However, due to the flexibility of the material comprised in columns 911, with sufficient decoupling pressure (pulling the sections back apart) the sections of cord 901 may be separated again at intersection 920, with substantially no damage to cord 901, which is then able to be self-bonded again at any then-available location.

It should be understood that the particular column and barb shapes and sizes pictured are exemplary only, but a sloped barb is preferred for a number of reasons. First, as mentioned above, it may mimic the curve of the outer surface of the barb (which is similarly sloped in a preferred embodiment), making tooling easier. Second, as the outer surfaces of the barbs pass next to one another during bonding, they tend to push against one another, and spread one another outward in the area of intersection and bonding. As this happens, the barbed inner surfaces will continue to lock when other shapes and configurations would fail due to the resultant leaning columns. Columns or other layered features with more than one possible locking interaction, based on the degree of pressure, may also be used. Such shapes and features are discussed, for example, in reference to FIG. 11, below, in the context of reversible self-bonding tapes.

Among other possible column sizes, micro- or nano-scale size bonding projections or sizes somewhat larger or smaller than (in addition to, or as an alternative to) the size pictured may be used in cord 901 for both the columns and smaller-scale bonding sub-features (and sub-features of those sub-features, and etc.) comprised in the surface of columns 911. In addition to the columns pictured, such smaller scale sub-features may include micro- or nano-sized artificial cilia, setae, spatulae, or lamellae that bond to other surfaces (and, especially, other inserted columns from other sections of cord 901) through chemical or other small-scale interactions (e.g., van der Waals forces). In one embodiment, such sub-features include both male- and female-shaped projections, or flexible hooks and loops, or magnetically charged elements (with opposing charges spaced from one another at spatial intervals) to further promote strong but reversible bonding. In some embodiments, the sub-features are flattened, to promote interaction with surfaces, while, in others, the sub-features are edged or barbed, to promote interaction with and physical gripping of rough surfaces. In still other embodiments, the sub-features may emanate from their connections at oblique angles, more parallel to the length of cord 901 than columns 911 on which they are held, and curve back toward cord 901, to promote both a variety of adhesion angles with a surface against which cord 901 is pressed, and to enable removal of cord 901 by peeling it away from a surface with which it is bonded (which may or may not be another section of cord 901, in some embodiments). In some embodiments, rather than simply ramifying from one another, such sub-features may be interconnected at points along their length, while still leaving exposed ends for interaction. These embodiments promote holding strength due to increased lateral support, while enabling smaller-sized (more interactive) sub-features with a larger surface area.

Figure 10:
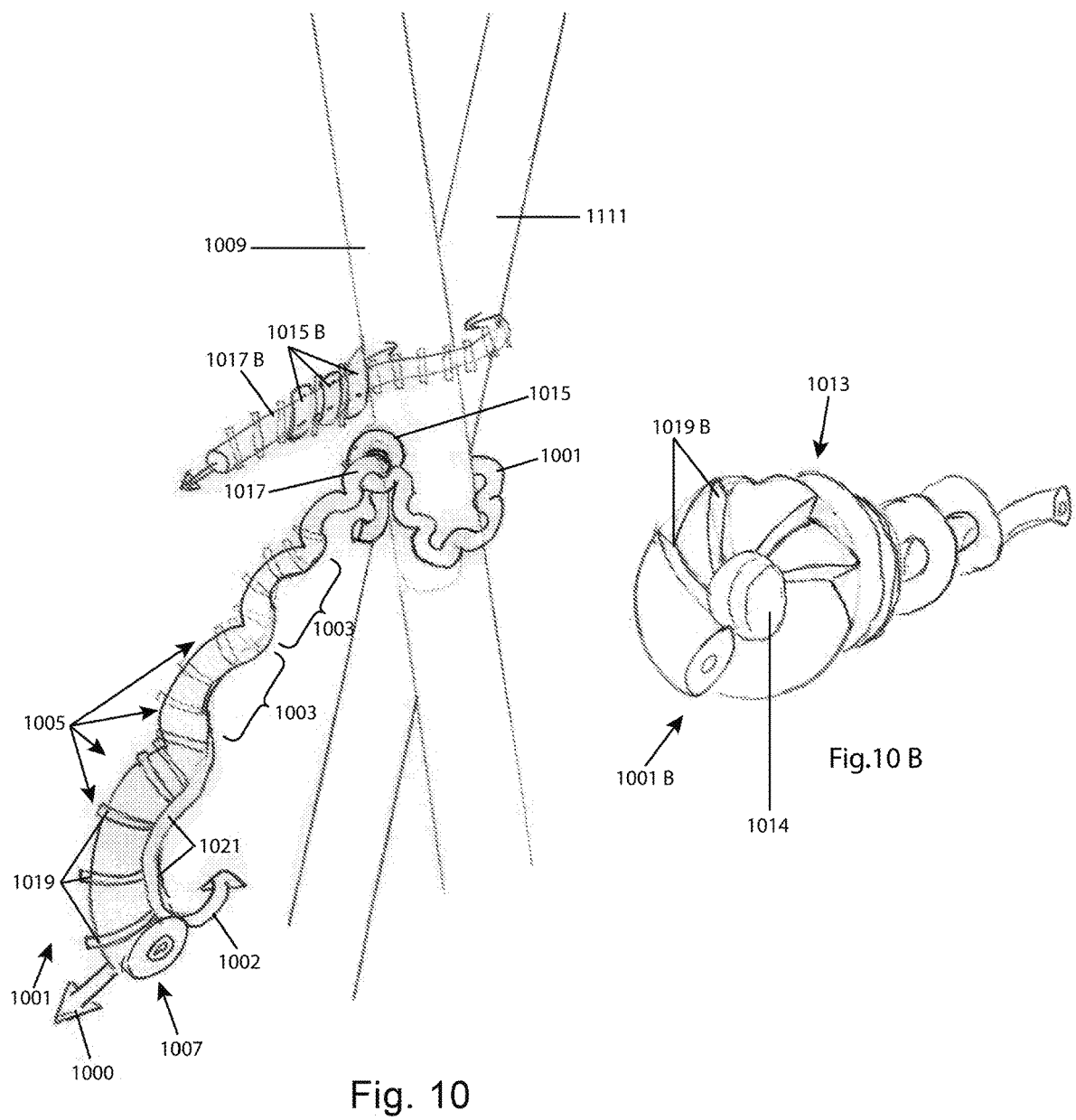
FIG. 10 is a perspective view of another new type of self-bonding cord, with a spiral memory and force-loading properties, in accordance with aspects of the present invention.

FIG. 10 is a perspective view of another new type of reversibly self-bonding cord 1001, with a spiral memory and force-loading properties, in accordance with aspects of the present invention. Cord 1001 comprises periodic semicircular curved sections, such as the examples shown as 1003, which, when cord 1001 is pulled taut (e.g., in the direction of arrow 1000), become elongated (more linear), as pictured at a pulled length 1005 of cord 1001, near an end 1007 of cord 1001. However, cord 1001 will have a resilient tendency, and exert a force opposite to this, as shown by force arrow 1002, when cord 1001 is pulled taut. Thus, when cord 1001 is pulled taught around loose objects, such as exemplary sticks 1009 and 1011, cord 1001 takes on a more conventional, linear appearance (although not completely straightened or linear except in instances of extremely large tension). A user may select different degrees of tautness and, due to the flexibility and curve memory of the materials comprised in cord 1001, exert an active, binding force to the bound objects due to the tendency of cord 1001 to rebound into a more curved configuration when tension is released from cord 1001. In other words, different degrees of force can be applied by wrapping bonding cord 1001 around loose objects and self-bonding the cord in that position with different degrees of tension. However, due to the spring constant of the coiled cord 1001, a relatively constant binding force can be applied over a range of cord tensions, which is another advantage.

Although cord 1001 self-bonds by contact, as with embodiments discussed above for other forms of cord, it does so with a different mechanism. To aid in self-bonding, curved sections 1003 tend to form a tight spiral, such as the spiral configuration pictured for cord section 1013 depicted in view 10B, when not under tension—forming a central void 1014 with the same circumference as any length of cord 1001 when pulled tight into a linear configuration. This natural tendency encourages loose lengths of cord 1001 to be wrapped tightly around the circumference of other lengths of cord when a user actuates cord 1001 to self-bond it. Ideally, a user binds loose objects by first wrapping them in cord 1001, and then taking one loose length 1015 of cord 1001 and encircling the shaft of the other loose length 1017 of cord 1001. Preferably, and for added grip and bonding strength, a user may fully encircle the shaft of loose length 1017 by wrapping at least two semi-circular sections 1003 around the shaft's circumference, as pictured. But length 1015 may be wrapped about length 1017 many more times, or less times, and at different locations (including in lengths under tension, with several crossing wraps) for added strength—as shown in alternate configurations 1015B and 1017B. Periodic ridges or holding edges, such as the examples pictured as 1019, also may be provided along part or the entire length of cord 1001, to hold sections of cord so wrapped. Preferably, ridges or edges 1019 are spaced sufficiently to fit wrapped sections of cord 1001, as discussed above, between them—with a gap between ridges coinciding with the contact profile of the cord sections wrapped around them. Among other possibilities, a flat-edged ridge, barb or other edge may be used, as pictured in FIG. 10. Alternatively, a sloped ridge, integral with the profile of cord 1001, may be used, as shown by example cord length 1001B and sloped, integral ridge examples 1019B, of view 10B. In either event, a perpendicularly flat inner face 1021 at the inward-facing, shaft-gripping curve of the outer surface of cord, may also be provided.

Figure 11:
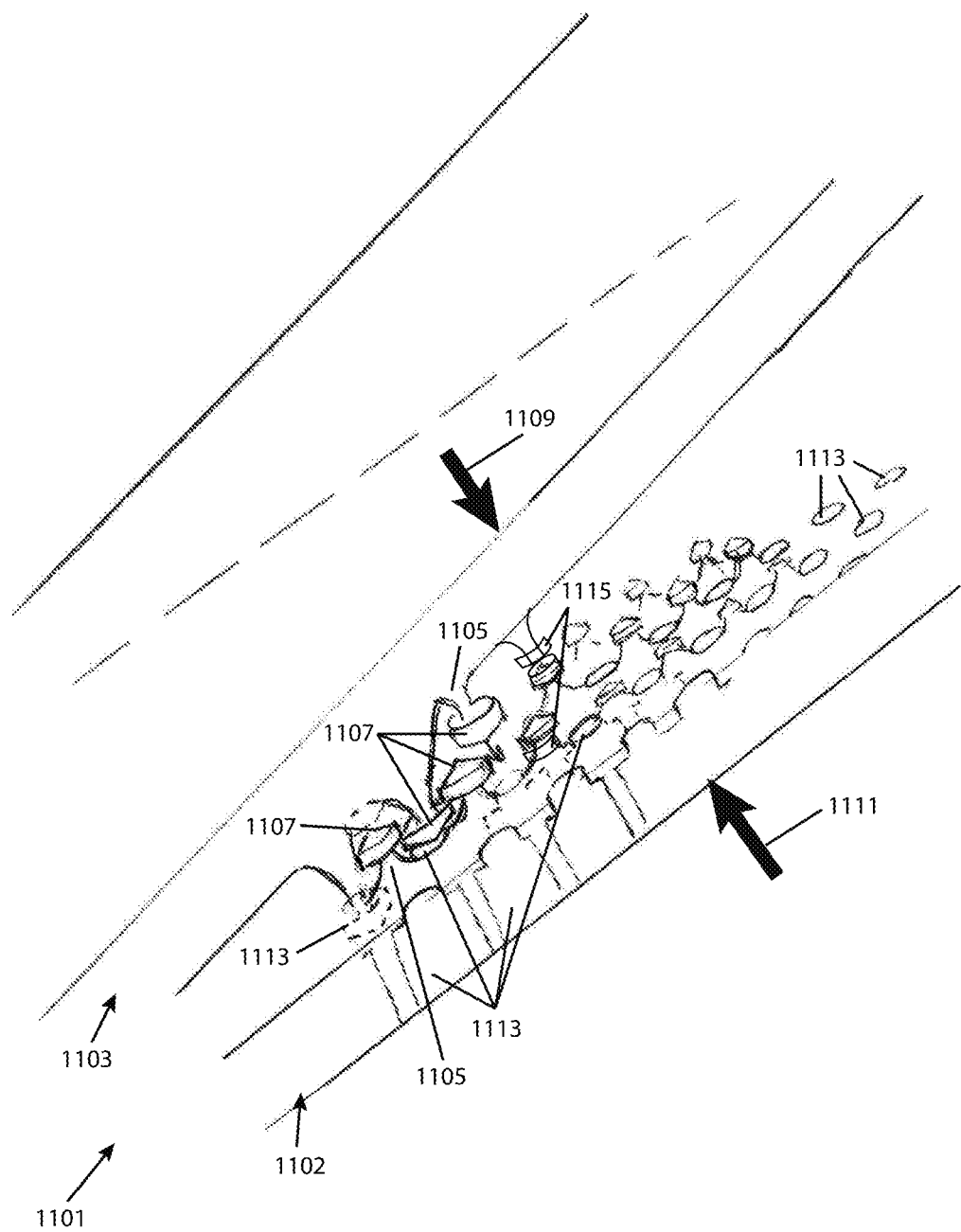
FIG. 11 is a perspective view of a new type of self-bonding flat tape, with touch-actuable, different bonding strengths, in accordance with aspects of the present invention.

FIG. 11 is a perspective view of a new type of reversibly self-bonding flat tape 1101, with touch-actuable, different bonding strengths, in accordance with aspects of the present invention. Two mating lengths, 1102 and 1103, of tape 1101 are pictured in the figure, and, as with the self-bonding cords discussed above, comprise interlocking columns, such as the examples pictured as 1105, which themselves comprise distal, sloped barbs 1107 that form an outer surface of the tape. And, as discussed in FIG. 9, these barbs interlock with one another upon pressing past one another. With an initial bonding pressure, as shown by force arrows 1109 and 1111, this first may occur, and result in a first bonding strength. However, as additional pressure drives columns 1105 past each other more deeply, barbs 1107 may penetrate and interlock with a barbed portal, such as any of the examples pictured as 1113. Because it is more integral with the surface of the tape, the interior barbed surfaces of each portal 1113 may hold each barb 1107 more firmly than when barbs 1107 interlock with one another alone. In addition, to further increase the staged bonding force with increased bonding pressure, each column may comprise multiple barbs, including a mid-length barb (such as the examples pictured as 1115.) Thus, when two lengths of tape, 1102 and 1103, are fully pressed together, each column 1105 may penetrate an opposing portal 1113 on the other length of tape while each mid-length barb (one on each column) interlocks with another mid-length barb, increasing the bonding strength further at a second, greater level of bonding pressure than that causing the initial engagement of barbs 1107 alone.

Figure 12:
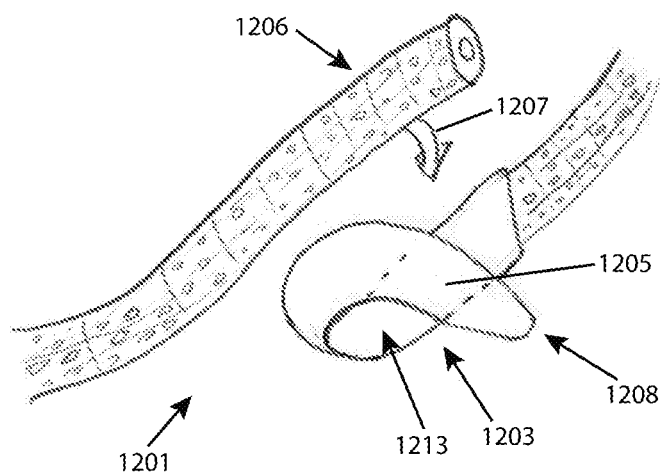
FIG. 12 is perspective view of a self-binding cord comprising a specialized loop-hook at one end for quickly engaging and binding another free length of the self-binding cord.

FIG. 12 is perspective view of a self-binding cord 1201, comprising a specialized loop-hook 1203 at one end for quickly engaging and binding another free length of the self-binding cord. Although, as with other cords set forth in this application, cord 1201 preferably comprises a flexible material with a high tensile strength, loop-hook 1203 itself is preferably composed of a more rigid material (e.g., metal or hard plastic), albeit preferably with some flexibility for operations that will be discussed in greater detail below. Loop-hook 1203 preferably contacts itself at an overlapping contact point/area 1205, but comprises a sloped surface, enabling a length of cord to pass through that contact point/area 1205, and open contact point/area 1205—for example, when exemplary free end 1206 is passed in the direction indicated by binding maneuver motion arrow 1207. In other words, edges of loop-hook 1203 are raised away from contact point/area 1205 (toward the viewer, in the perspective of the figure), especially at hook tip 1208, to facilitate the lateral insertion of a free length of the cord between contacted aspects of loop-hook 1203 at contact point/area 1205. During such lateral insertion, loop-hook 1203 flexes to take on a temporarily open, more hook-like structural configuration. Before and after such an insertion operation, loop-hook 1203 is more in the form of a closed loop structural configuration, due to the then pressed-together contacted aspects at contact point/area 1205, due to the memory and tendency of the comprised materials to take on that conformation, and press together at the contact point/area. In some embodiments, however, a contact point or area, or other area of self-overlap, may be omitted—and loop-hook 1203 may always have an open gap.

Figure 13:
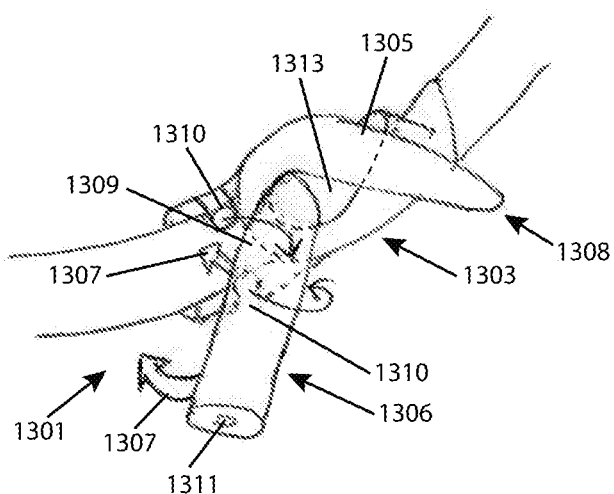
FIG. 13 is a perspective view of a self-binding cord comprising a specialized loop-hook similar to that depicted in FIG. 12, above, with a loose end in the process of being engaged in the void of the loop-hook to capture and bind objects.

After so passing through contact point/area 1205, free end 1206 is preferably then reversed back onto itself, as shown with respect to similar free end 1306 by self-bonding motion arrows 1307 of FIG. 13, and holds at the loop-hook (now 1303) to bind objects held by (e.g., wrapped in) the cord, which otherwise tend to pull the lengths of the cord away from one another. When free end 1206/1306 is pressed against itself at an intersection such as 1309, it may self-bond according to any of the techniques for self-bonding set forth above. Alternatively, a more conventional form of rope or twist tie, although with the improvement of a loop-hook 1203/1303, may be used instead of a self-bonding cord. In either event, loop-hook 1203/1303 may also comprise cord- or tie-holding snaps 1310, which can be pushed over and around, and hold, any length of the cord or tie pressed against and into it. In some embodiments, the self-binding cord 1201/1301 comprises an inner core 1311 with a high-tensile strength and an alterable memory.

In some techniques according to aspects of the invention, a user may disengage loose ends of cords from the loop-hook by reversing the operation set forth above, and passing free end 1206/1306 back through the contact point/area 1205, to release cord 1201/1301, and unbundle any objects held by cord 1201/1301. However, according to other techniques, free end 1206/1306 may be released simply by pulling apart the bonded sections of the cord, and allowing free end 1206/1306 to slip through the void 1213/1313 of loop-hook 1203/1303, if, in that embodiment, locking ridges or barbs preventing such removal, as discussed above and below, are not included.

It should be understood that any aspects of the above self-ratcheting and self-bonding cords, tapes, and other binding techniques, may be combined with each other, and present in other embodiments. For example, the one-way, self-ratcheting ridges and locking barbs of certain embodiments discussed with reference to FIGS. 1-6 may be interposed for the gripping ridges of cord techniques set forth in FIG. 10, above, and vice versa. Similarly, the central voids 1213/1313 of loop-hooks set forth immediately above, in FIGS. 12 and 13, and the central void 1014 of FIG. 10, may, as with the ports set forth in FIGS. 1-7, may provide for self-ratcheting of such cords comprising one-way, self-ratcheting ridges and locking barbs, by (among other aspects discussed above for self-ratcheting ports) comprising the same or a slightly larger diameter than that of the cord (excluding such ridges and barbs.) Any of the cords or other mechanical structures set forth in this application may comprise any of the materials and structures (or any similar materials or structures known in the art) set forth for any other cord or mechanical structure set forth in this application.

Figure 14:
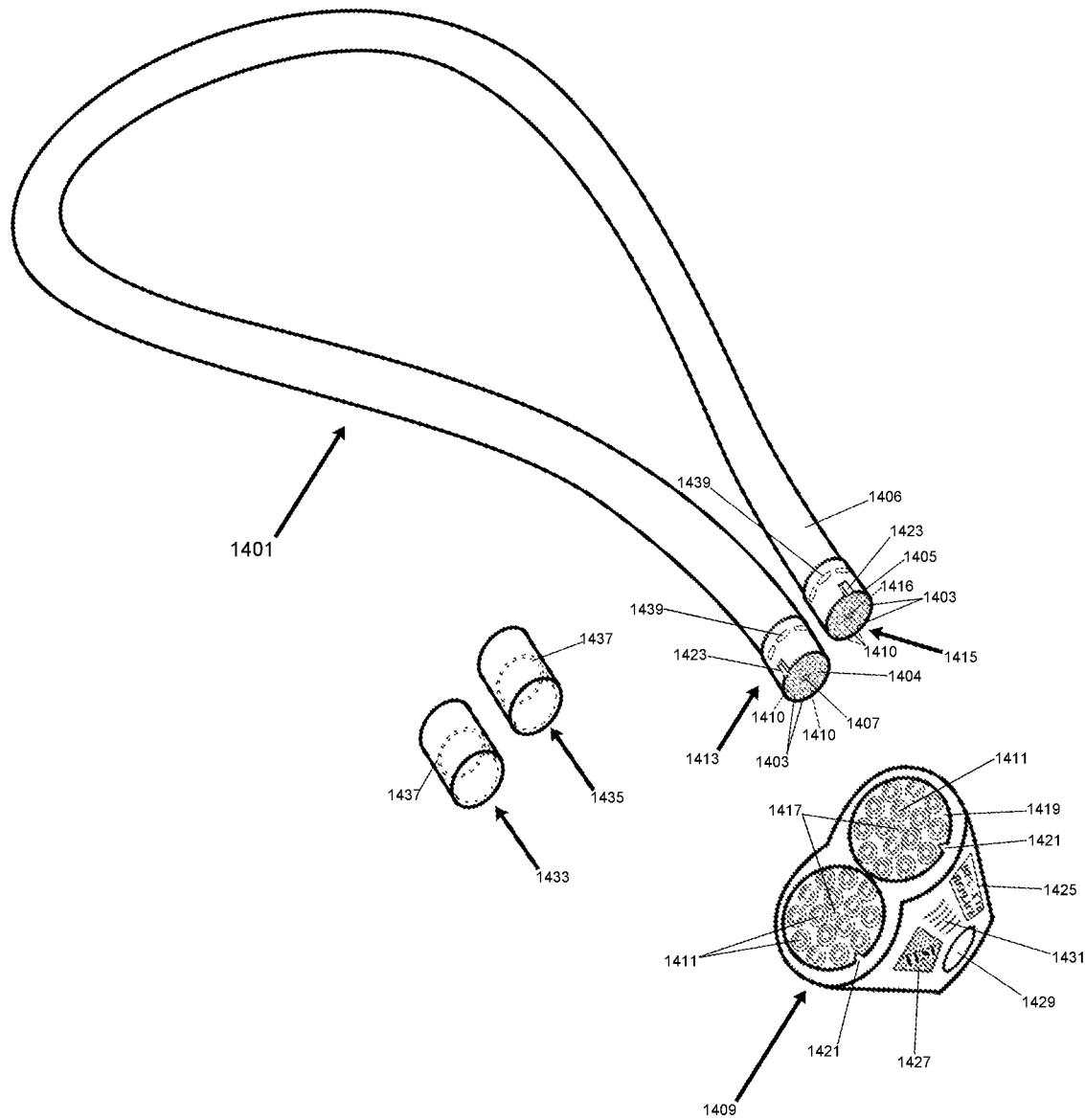
FIG. 14 is a perspective drawing of example aspects of a new type of system-testable and healable cord, and example aspects of hardware for testing and storing such a cord.

FIG. 14 is a perspective drawing of example aspects of a new type of system-testable and healable cord 1401, and example aspects of hardware for testing and storing such a cord. As with conventional ropes, cords, ties, and other flexible fasteners, cord 1401 is a flexible length of material that can be used for any activity or task involving binding or suspending objects and living things (for example, holding objects and persons in rock climbing or, as another example, holding structural parts of suspension bridges). Unlike conventional cords and ropes, however, cord 1401 comprises a set of independently testable fluid-passing fibers, such as the examples pictured as hollow fibers 1403, each extending lengthwise throughout cord 1401, and each with a tensile strength contributing to the overall strength of cord 1401 as a flexible connector. In some embodiments, a plurality of testable hollow fibers 1403 may be each, independently testable. In some such embodiments, each of testable hollow fibers 1403 may be each independently testable. To accomplish this, the material comprised in each of testable hollow fibers 1403 (which may, itself, be comprised of several fibers, interwoven or otherwise arranged, in some embodiments) may comprise a material with a galvanic resistance measurably-related to its physical integrity. For example, as subcomponents of each of testable hollow fibers 1403 break down, the galvanic resistance of them will increase due to lower conductivity, while, at the same time, the strength of those subcomponents will also decrease. Examples of testable materials include flexible conductive metals, graphene, nylon and other textiles which may be impregnated or doped with conductive materials in some embodiments, and fiber optics (testable for integrity by the passage of light), any or all of which materials may be used in various combinations in various embodiments of the invention. In some embodiments, separate subcomponents, Material A and Material B, comprising at least two different materials, of each of testable hollow fibers 1403 are included, Material A being testable for structural integrity via resistance, light or other phenomenon passage through it and closely integrated with or otherwise associated with Material B, comprising load-bearing structural components for providing the tensile strength of the cord. In some embodiments, Material A comprises a weaker material, with greater fragility, tightness, more distally located (toward the surface of the cord) and/or with less flexibility than Material B (or having any of these property differences), in various embodiments. In this way, the tested material is much more likely to break first, and, being tested, will register positive for a breakdown in integrity of fiber 1403, before or at least immediately upon the breakdown of the load-bearing material (Material B) of fiber 1403. To aid in individually testing the integrity of each fiber 1403, an insulator, such as the example pictured as 1405, may be provided, encapsulating and separating each fiber 1403 from one another. In this way, contacts for passing current or other testing phenomena through each fiber 1403 can be separately applied to each fiber 1403, as will be explained in greater detail below. However, it is preferred that such insulation and each fiber 1403 be tightly fastened, locked and interconnected with a strong internal adhesive material 1404 (stronger and less flexible than any of the other fibers within cord 1401) to every other component of cord 1401, such that neither the insulation of each fiber 1403 nor an outer surface material 1406 is able to slide or shift relative to any other component. In this way, in such embodiments, the interstitial adhesive material 1405 ensures that each component of cord 1401 contributes to a load borne by cord 1401, and provides an additional, back-up load-bearing structure for a user, if any or all of fibers 1403 become compromised by a load or event sufficient enough to do so, but insufficient to compromise the greater strength of the adhesive material. Thus, a cord 1401 may still be serviceable, adding an increased safety margin, while reporting cord 1401 as compromised in testing, as discussed further below. Preferably, the strength of such an adhesive material alone is sufficient to rate the cord as safe for any intended use, to provide this safety margin. In addition, a central, namely, core element 1407, with a greater strength by itself than needed for an anticipated use of cord 1401, is also provided in some embodiments. Central core 1407 can comprise very strong, flexible materials, such as steel cable, carbon fiber or graphene. In some embodiments, central core 1407 is independently testable for integrity but, in other embodiments, central core 1407 is untested, due to a safe assumption that it will remain sufficiently strong if other components test as safe.

As mentioned above, in some embodiments, at least some of testable hollow fibers 1403 comprise at least one passage(s) or void(s) (i.e., have a hollow or hollows.) In some such embodiments, at least some of testable hollow fibers 1403 have a central, longitudinal void. In some such embodiments, such a central, longitudinal void(s) permit(s) the passage of a healing fluid, with sub-components which fill and join cracks, holes, fissures and/or other gaps, through the longitudinal void(s). For example, in some such embodiments, such a healing fluid, with sub-components which fill and join cracks, holes, fissures and/or other gaps may be injected into such a central, longitudinal void(s), which may be open on one or (preferably) both ends of each of testable hollow fibers 1403. Examples of such healing fluids and/or subcomponents include epoxies, glues, adhesives, fillers, resins, polymers, metals, bonding materials and particles, and electrolytes. In some embodiments, hardware with conductors that contact such testable hollow fibers 1403 may apply a charge to testable hollow fibers 1403, and materials constituting the interior surface of such a central, longitudinal void(s). In some such embodiments, after holding such a charge, such a healing fluid, with charged adhesive or otherwise healing particles, each holding an opposite charge to the charge of testable hollow fibers 1403 and materials constituting the interior surface of such a central, longitudinal void(s), is then injected into such a central, longitudinal void(s). In some such embodiments, such charged adhesive or otherwise healing particles are drawn strongly to materials (with an opposite charge from such particles) exposed by fissures or other gaps in materials constituting the interior surface of such a central, longitudinal void(s). For example, in some such embodiments, such materials exposed by fissures or other gaps are covered by an interior lining or covering material (e.g., with a neutral charge), when such a central, longitudinal void(s) are manufactured. Under wear and tear (e.g., from bearing loads) such a lining or covering material may break down, creating such fissures or other gaps, and so exposing such materials with an opposite charge. In some embodiments, rather than opposing charges, opposing reactivity of such particles and materials are used. In some embodiments, atoms or compounds, rather than or in addition to particles, with the same charge or reactivity characteristics stated above, are used as stated above for particles.

To test the integrity of each fiber 1403, (and, in some embodiments, other components, of cord 1401), an externally-applied testing unit 1409 is provided in some embodiments. It should be noted that unit 1409 is pictured as being closer to the viewer than cord 1401, to aid in seeing its features, but it should be understood that testing unit 1409 is actually of a complementary size to fit exactly over the ends of cord 1401 snugly. External testing unit 1409 may comprise and/or be connected and able to communicate with a control system comprising computer hardware and software, such as control system 1600 provided in FIG. 16, infra—for example, with a U.S.B. cable or other connection and communication techniques known in the art. As such, unit 1409 may comprise battery(ies) for power and/or external power source(s), such as a power adapter connectable to a wall outlet, or photovoltaic or other ambient power converters, to run the processes set forth in reference to FIG. 15 related to testing the integrity of fibers and other subcomponents of cord 1401.

Among other features, testing unit 1409 comprises an array of separately-chargeable contacts, such as the examples pictured as 1411, arranged in a pattern such that each contact 1411 corresponds to the position of the end of one of testable hollow fibers 1403 (each such end thereby contacting a contact 1411, and serving as a complementary contact 1410 (e.g., electrical), as discussed below) exposed at the ends 1413 and 1415 of cord 1401. In addition, two central, bladed contacts 1417 have a position corresponding to (i.e. matching) the position of the cross-cut central core element 1407, in some embodiments (which cross-cut central core therefore contacts, and serves as a complementary contact 1416, interfacing with bladed contacts 1417, as discussed below). Thus, to test the integrity of each fiber and component of cord 1401, a user may apply testing unit 1409 to the ends 1413 and 1415 of cord 1401 by pressing contacts 1411 against each exposed end, end 1413 and 1415 (which are also a contact 1410), of each testable hollow fibers 1403. A pressure sensor, for example, on plate 1419 encompassing contacts 1411, may indicate that a user has attempted to so press unit 1409 and ends 1413 and 1415 together, for testing. To avoid errors by ensuring a proper alignment of contacts 1411 with the ends of fibers 1403 (e.g., end 1413 and 1415, which are also a contact 1410), in some embodiments, keys 1421 within the mating area of unit 1409, slidingly engage with guidance slots 1423 of ends 1413 and 1415, ensuring that alignment when coupling unit 1409 with ends 1413 and 1415 for the testing described herein. If an improper alignment or other improper coupling is, nonetheless, detected by the control system comprised in or comprising unit 1409, unit 1409 may report that improper alignment on an external display or other GUI, such as external display 1425, in some embodiments. To power on, or initiate testing using unit 1409, user-actuable button 1427 labeled "TEST" is also provided, in some embodiments. Use of such features is discussed in greater detail, below, in reference to FIG. 15. Each of testable hollow fibers 1403 is tested by unit 1409 by applying a positive and negative voltage, respectively, through the pair of contacts corresponding to and aligning with the ends of a given one of testable hollow fibers 1403. Thus, unit 1409 can apply a voltage and current through each of testable hollow fibers 1403, individually, and, based on the amount of current or resistance measured, assess whether the physical integrity of each of testable hollow fibers 1403 has changed over time (or in comparison to a normal or expected resistance for a given cord 1401 and its reported, optimal characteristics, which may be user-entered or automatically assessed by cord-identification upon coupling of unit 1409 with cord 1701.) For example, the cord may have a signature resistance or serial/model number and length readable by unit 1409 upon coupling, and unit 1409 may have or have access to a library of normal or expected optimal resistance or other measured characteristics for the cord. In some embodiments, cord 1401 may have a readable or other directly-passable data encapsulating the normal/expected resistance for each fiber, rather than bothering with model and unit numbers and other intermediate steps. In some embodiments, the resistance level or other marker of physical integrity of each fiber 1403, as scanned by unit 1409, may have been altered by previous treatments with a healing fluid, as described above. In some such embodiments, in which conductive particles have been used to heal fissures and other gaps within the fibers, the resistance of such healed fibers my be scanned, resulting in a scan indicating such a healed condition (or degree thereof). In some such embodiments, a pattern or degree of resistance may indicate such a healed condition (or degree thereof). Unit 1409 preferably has a small profile, and is light and portable, such that it may be used in camping and other outdoor activities. To enhance its portability, a keychain or carabineer port 1429 may be provided. To ease coupling and pressing unit 1409 against the ends 1413 and 1415, a thumb-grip 1431, may also be provided, in some embodiments.

To protect the ends 1413 and 1415 when not under testing, end caps 1433 and 1435 are also provided, in some embodiments. In some embodiments, end caps 1433 and 1435 fasten tightly to ends 1413 and 1415 with the aid of internal ridges 1437, which snap into and hold complementary locking ridges 1439, on the exterior circumference of ends 1413 and 1415.

Figure 15:
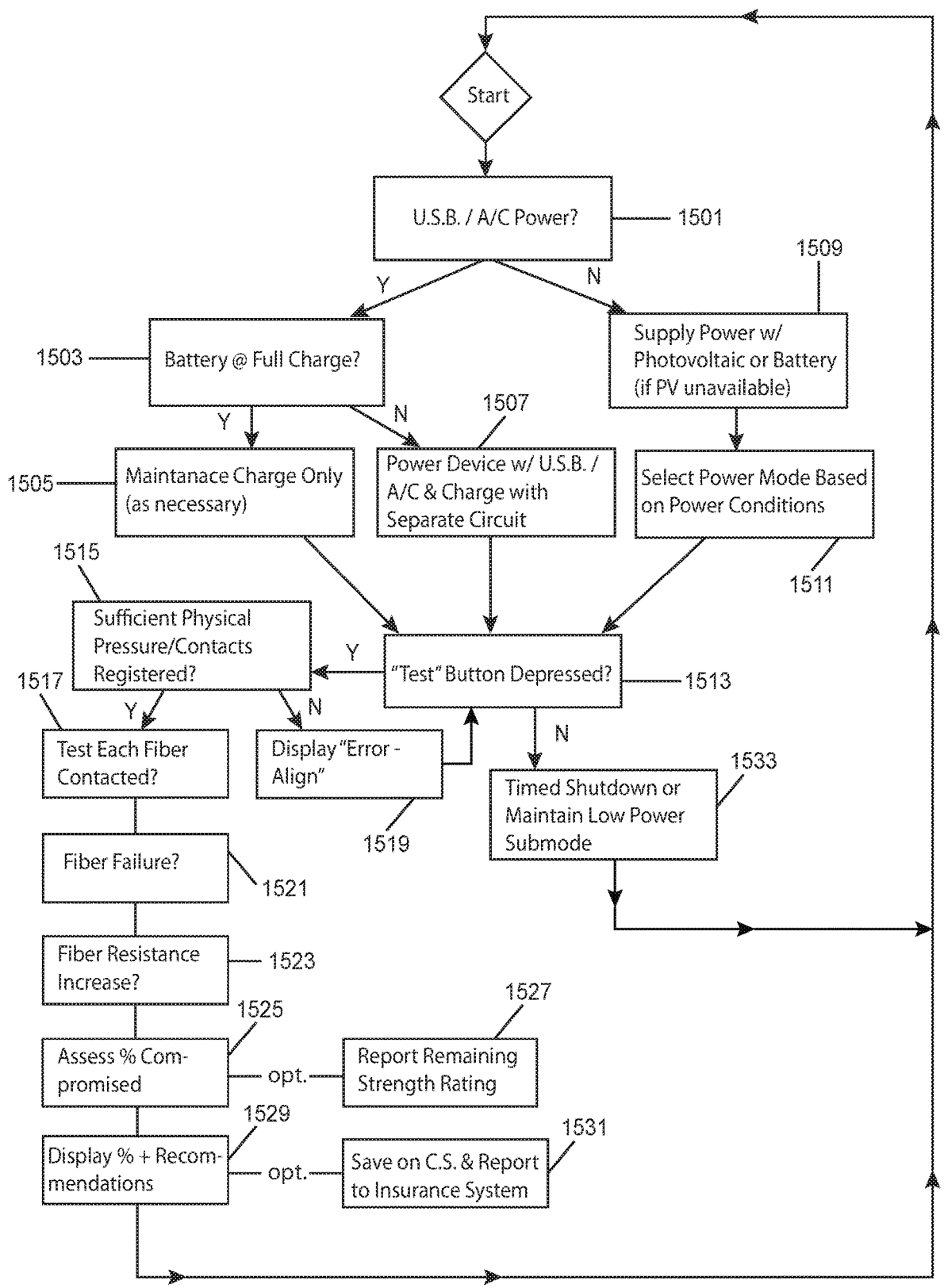
FIG. 15 is a chart describing exemplary steps for a control system, comprising computer hardware and software, to diagnose conditions of a testable cord connector, and to prevent and report risks associated with those conditions.

FIG. 15 is a chart describing exemplary steps for a control system, comprising computer hardware and software, to diagnose conditions of a testable cord connector, such as the cord 1401, set forth above in reference to FIG. 14, and to prevent and report risks associated with those conditions. As explained above, these steps may be carried out using a testing unit, such as testing unit 1409, which may comprise or be comprised in such a control system. An example control system is set forth below, in reference to FIG. 16.

Beginning with step 1501, the control system first determines whether the testing unit has access to a sufficient external power source (e.g., from a U.S.B. cable, conventional A/C power cord) for powering the remaining operations set forth in reference to this figure. If so, the control system proceeds to step 1503, where it assesses whether a battery within the testing unit is fully charged (to its full recommended capacity of electrochemical energy). If so, the control system next proceeds to step 1505, in which it enters a mode for maintaining/restoring that optimal charge, if the on-board batter falls below it. If, at step 1503, the control system determines that the battery is not sufficiently charged, it proceeds to step 1507, in which it accesses external power sources to run its operations, preferably while charging the battery with an independent, charging circuit. If, at step 1501, the control system determined that an external power source is not available, it may proceed to step 1509, in which it uses accesses power from a photovoltaic array, if available or, if not, from the local battery/capacitor(s)/other power storage. Depending on the availability of such power storages or sources, the control unit enters a corresponding power mode utilizing the available source(s), at step 1511.

In any event, after settling these power source issues as set forth above, the control system next proceeds to step 1513, in which it determines whether a user has depressed the button within a GUI of the testing unit labeled for initiating usage, or "TEST," as set forth above. If a user has pressed the TEST button, indicating a desire to test a cord coupled with the testing unit, as discussed above, the control system next proceeds to step 1515, in which it determines whether the contacts for testing fibers 1403 have been pressed together with the ends of the cord tested to a sufficient degree of pressure to maintain electrical or other testing contact, and effectuating testing (e.g. with a pressure-sensitive plate, and separately system-addressable resistance sensors connected with each separately electrically system powerable contact 1411). If so, the next separately tests each set of contacts corresponding with each separately-testable fiber of cord 1401, as discussed above, in step 1517, for example, by applying a voltage through it to complete a circuit (if possible) and assessing the level of current or resistance. If, in step 1515, sufficient pressure or alignment of the contacts with the ends of each fiber has not occurred, the control system may deliver an error message to the user, in step 1519, and return to step 1513. If proper pressure and alignment has occurred, but no current appears to pass through a particular fiber tested, the control system assesses and may report a total fiber failure, in step 1521. If a total fiber failure has not occurred, any increased resistance in the fiber associated with compromised integrity may be sensed and recorded, in step 1523. That increase may be assessed, as discussed above, relative to a norm for a given cord type, or based on past history with the cord or manual entry of optimal resistance. Also, as discussed above, in some embodiments, other tests, such as light-carrying with optical fibers, may instead or in addition, be used to assess cord component integrity associated with the cord's continued safety in carrying particular loads. For example, in step 1525, the control system may assess a percentage by which the fiber is determined to have its load carrying capabilities compromised, based on an associated resistance curve corresponding with cord strengths. The control system may then record and/or report that percentage as a remaining strength rating, in optional step 1527. That total or partial fiber compromise assessed in steps 1521 to 1525 may then be applied by the control system in a larger algorithm, combining and weighting the test results from all of the other tested cord components, rendering an overall recommendation regarding whether the cord is safe to continue using, or should be retired, and/or its current strength rating (e.g., ability to support X pounds), in step 1529. In some embodiments, a user's liability insurance coverage for related hazardous activities may be keyed on the results of cord testing. In those embodiments, the control system may record and report the results of the cord test externally (e.g., to an insurance company's internet server) in optional step 1531. Rates and coverages can then be keyed on that recorded data.

If, in step 1513, the user has not initiated testing, the control system may shutdown after a given amount of time passes, or maintain a low power mode, until such testing is initiated, or changes to the power supply occur, in step 1533. The control system then returns to the starting position.

It should be understood that, although several internal fibers and other testable components of a tested cord are provided and tested in the embodiment above, in some embodiments, more, or fewer such fibers or components may be used. In some embodiments, a single internal testable material of the tested cord, the resistance of which varies with wear and strength and integrity loss, may be tested by the control system and assessed with results displayed as set forth above. Furthermore, it should be understood that, although the example of a flexible connector or fastener has been provided, the techniques, devices, systems and methods of the present invention may be implemented in a wide variety of alternative structural and material environments. For example, in some embodiments, the fibers comprising voids set forth above may be present in other structural elements, such as walls, joists, other connectors, or panels of a wide variety of structures, such as buildings, motor vehicles and bridges. In some embodiments, such fibers may not be cylindrical (not pictured) and may form the part of non-cylindrical (e.g., flat) collections of such fibers, in various alternative embodiments, in addition to, or instead of, the structural embodiments pictured. In other words, the present invention may be used to ensure the integrity of any structural piece, of any structure, incorporating any aspect of the invention, in various embodiments of healing materials, and the testing thereof.

In some methods and embodiments of the present invention, a user may "save" an existing cord that tests insufficiently strong by locating an area of compromised integrity within the cord. In these methods and embodiments, the testing unit may sense, estimate and report the location of increased compromise by echolocation (the distance to a point, e.g., of traveling and rebounded light on a fiber optic channel within the cord). Alternatively, a user can assess the location by trimming off lengths of the cord, and retesting the newly-exposed cord ends, until the control system reports a desired improvement in cord integrity (e.g., increased strength rating.)

Figure 16:
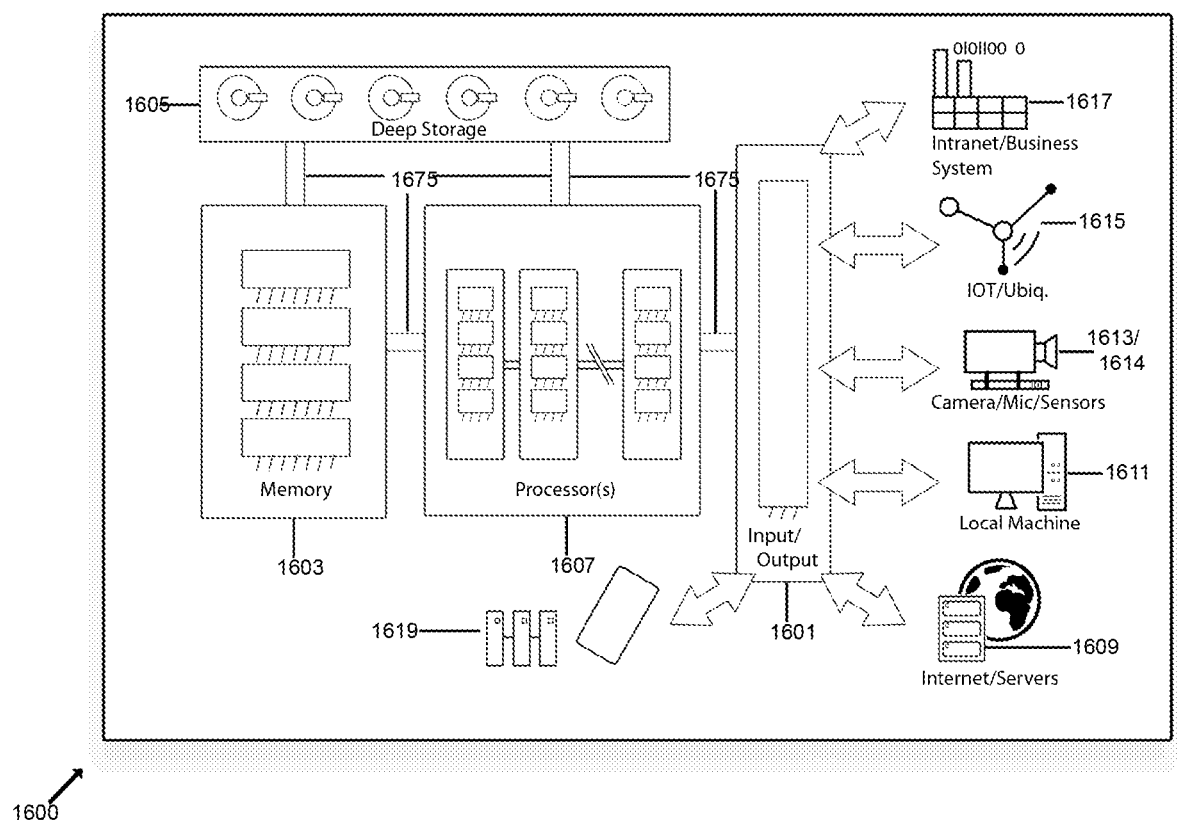
FIG. 16 is a schematic block diagram of some example elements of an example control system, preferably incorporating a non-transitory machine-readable medium, that may be used to implement various aspects of the present invention, some of which are described in reference to FIGS. 1-15, above.

FIG. 16 is a schematic block diagram of some example elements of an example control system 1600, preferably incorporating a non-transitory machine-readable medium, that may be used to implement various aspects of the present invention, some of which are described in reference to FIGS. 1-15, above. The generic and other components and aspects described herein are not exhaustive of the many different control systems and variations, including a number of possible hardware aspects and machine-readable media, that might be used, in accordance with embodiments of the invention. Rather, the control system 1600 is described herein to make clear how aspects may be implemented.

Among other components, the control system 1600 may include an input/output device 1601, a memory device 1603, a longer-term, deep data storage media and/or other data storage device 1605, and one or more processors 1607. The processor(s) 1607 is (are) capable of receiving, interpreting, processing and manipulating signals and executing instructions for further processing and for output, pre-output and/or storage in and outside of the control system. The processor(s) 1607 may be general or multipurpose, single- or multi-threaded, and may have a single core or several processor cores, including microprocessors. Among other things, the processor(s) 1607 is (are) capable of processing signals and instructions for the input/output ("I/O") device 1601, to cause a user interface to be provided or modified for use by a user on hardware, such as, but not limited to, a personal computer monitor or terminal monitor with a mouse and keyboard and presentation and input-facilitating software (as in a GUI), or other suitable GUI presentation system (e.g., on a smartphone touchscreen, a smartphone case peripheral device screen, and/or with other ancillary user input hardware, such as compressible members with motion sensors, as discussed elsewhere in this application).

For example, in some embodiments, sensor(s), tester(s) and/or other user interface aspects may send electricity through a conductor, and/or sense conduction and resistance, converting it to input, from a cord and cord fiber integrity testing device, as set forth herein, or from a user and present user(s) with selectable options, such as preconfigured commands, to interact with hardware and software of the control system and scan the structural integrity, or markers of structural integrity, of a flexible fastener (e.g., a cord or rope) as described herein, or to carry out any other actions set forth in this application for a control system. The processor(s) 1607 is/are capable of processing instructions stored in memory devices 1605 and/or 1603 (or ROM or RAM) and may communicate via system buses 1675. I/O device 1601 is capable of input/output operations for the control system 1600, and may include and communicate through innumerable input and/or output hardware, and innumerable instances thereof, such as a computer mouse(s), or other sensors, actuator(s), communications antenna, keyboard(s), smartphone(s) and/or PDA(s), networked or connected additional computer(s), camera(s) or microphone(s), mixing board(s), reel-to-reel tape recorder(s), external hard disk recorder(s), additional movie and/or sound editing system(s) or gear, speaker(s), external filter(s), amp(s), preamp(s), equalizer(s), filtering device(s), stylus(es), gesture recognition hardware, speech recognition hardware, computer display screen(s), touchscreen(s), sensors overlaid onto touchscreens, or other manually actuable member(s) and sensor(s) related thereto. Such a display device or unit and other input/output devices could implement a program or user interface created by machine-readable means such as software, permitting the system and user to carry out the user settings and other input discussed in this application. I/O device 1601, memory 1603, deep storage media device 1605, and processor(s) 1607 are connected with and able to send and receive communications, transmissions and instructions via system bus(es) 1675. Deep storage media device 1605 is capable of providing mass storage for the system, and may be a computer-readable medium, a connected mass storage device (e.g., flash drive or other drive connected to a U.S.B. port or Wi-Fi), may use back-end or cloud storage over a network (e.g., the Internet) as either a memory backup for an internal mass storage device or as a primary memory storage means, or may simply be an internal mass storage device, such as a computer hard drive or optical drive.

Generally speaking, the system 1600 may be implemented as a client/server arrangement, where features of the invention are performed on a remote server, networked to the client, and made a client and server by software on both the client computer and server computer. System 1600 is capable of accepting input from any of those devices and systems 1609-1619 (e.g., Internet/servers 1609, local machine 1611, camera/microphone/sensors 1613-1614, IOT/Ubiq. 1615, Intranet/business system 1617, and smartphone and/or web app 1619) and modifying stored data within them and within itself, based on any input or output sent through input/output device 1601.

Input and output devices may deliver their input and receive output by any known means, including, but not limited to, any of the hardware and/or software examples shown as 1609-1619.

While the illustrated example system 1600 may be helpful to understand the implementation of aspects of the invention, any suitable form of computer system known in the art may be used—for example, a simpler computer system containing just a processor for executing instructions from a memory or transmission source—in various embodiments of the invention. The aspects or features set forth may be implemented with, and in any combination of, digital electronic circuitry, hardware, software, firmware, modules, languages, approaches or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. Any or all of the method steps of the embodiments of the present invention may be performed by such a programmable processor, executing a program of instructions, operating on input and output, and generating output and stored data. A computer program includes instructions for a computer to carry out a particular activity to bring about a particular result and may be written in any programming language, including compiled and uncompiled and interpreted languages and machine language, and can be deployed in any form, including a complete program, module, component, subroutine, or other suitable routine for a computer program.

I claim:

1. A healable cord, comprising:
   at least one load-bearing fiber;
   at least one electrical contact conductively connected or integral with at least one of said at least one load-bearing fiber;
   at least one fluid-tight void, passing through an interior of said healable cord, and accessible for introducing fluid through said at least one fluid-tight void;
   wherein said at least one fluid-tight void comprises at least one healing fluid, said at least one healing fluid comprising sub-components which fill and adhere to cracks, holes, fissures and/or other gaps in said at least one load-bearing fiber.

2. The healable cord of claim 1, wherein said sub-components comprise at least one atom or compound which reacts with said at least one load-bearing fiber.

3. The healable cord of claim 1, wherein said healing fluid comprises healing particles and a carrier fluid material, in which said healing particles are dispersed.

4. The healable cord of claim 3, wherein the healing particles comprise an adhesive.

5. The healable cord of claim 3, wherein the carrier fluid material comprises an adhesive.

6. The healable cord of claim 3, wherein the healing particles comprise charged particles.

7. The healable cord of claim 6, wherein a material of said at least one fluid-tight void comprises a charge that is opposite from said charged particles.

8. The healable cord of claim 1, wherein said at least one fluid-tight void passes through an interior space of at least one of said at least one load-bearing fiber.

9. A method for facilitating testing integrity of a healable flexible connector, comprising the following steps:
   providing the healable flexible connector, comprising:
   at least one load-bearing fiber;
   at least one electrical contact conductively connected or integral with at least one of said at least one load-bearing fiber;
   at least one fluid-tight void, passing through an interior of said healable flexible connector, and accessible for introducing fluids through said at least one fluid-tight void; and
   scanning said at least one load-bearing fiber.

10. The method for facilitating testing integrity of the healable flexible connector of claim 9, comprising the following additional step:
    determining a condition of said healable flexible connector, based on said scanning.

11. The method for facilitating testing integrity of the healable flexible connector of claim 9, comprising the following additional step:
    injecting a healing fluid into said at least one fluid-tight void.

12. The method for facilitating testing integrity of the healable flexible connector of claim 9, comprising the following additional step:
    draining a healing fluid from said at least one fluid-tight void.

13. The method for facilitating testing integrity of the healable flexible connector of claim 9, wherein said at least one fluid-tight void passes through an interior space of at least one of said at least one of load-bearing fiber.

14. A healable cord, comprising:
    at least one load-bearing fiber;
    at least one electrical contact conductively connected or integral with at least one of said at least one of load-bearing fiber;
    at least one fluid-tight void, passing through an interior of said healable cord, and accessible for introducing fluid through said at least one fluid-tight void;
    wherein said at least one fluid-tight void comprises a healing fluid;
    wherein said healing fluid comprises healing particles and a carrier fluid material, in which said healing particles are dispersed.

15. The healable cord of claim 14, wherein the healing particles comprise an adhesive.

16. The healable cord of claim 14, wherein the carrier fluid material comprises an adhesive.

17. The healable cord of claim 14, wherein the healing particles comprise charged particles.

18. The healable cord of claim 17, wherein a material of said fluid-tight void comprises a charge that is opposite from said charged particles.

\* \* \* \* \*